US007478050B1

(12) United States Patent
Togawa et al.

(10) Patent No.: US 7,478,050 B1
(45) Date of Patent: Jan. 13, 2009

(54) SYSTEM FOR MANAGING RESOURCES USED AMONG GROUPS

(75) Inventors: Yoshifusa Togawa, Kawasaki (JP); Tomoharu Kariya, Kawasaki (JP); Rie Iimoto, Kawasaki (JP)

(73) Assignee: Fujitsu Limited, Kawasaki (JP)

( * ) Notice: Subject to any disclaimer, the term of this patent is extended or adjusted under 35 U.S.C. 154(b) by 0 days.

(21) Appl. No.: 09/225,208

(22) Filed: Jan. 4, 1999

Related U.S. Application Data

(63) Continuation of application No. 08/605,638, filed on Feb. 22, 1996, now abandoned.

(30) Foreign Application Priority Data

| Feb. 23, 1995 | (JP) | .................................. 7-034813 |
| Feb. 6, 1996 | (JP) | .................................. 8-19821 |

(51) Int. Cl.
*G06B 40/00* (2006.01)
(52) U.S. Cl. ........................................................ 705/8
(58) Field of Classification Search .................... 705/8, 705/9; 345/751, 331, 3; 455/413; 379/57; 710/2; 369/29, 75; 222/26, 32
See application file for complete search history.

(56) References Cited

U.S. PATENT DOCUMENTS

| 3,927,800 | A | * | 12/1975 | Zinsmeyer et al. ............. 222/26 |
| 4,884,219 | A | * | 11/1989 | Waldren ........................ 345/8 |
| 4,975,896 | A | * | 12/1990 | D'Agosto et al. ......... 369/29.01 |
| 4,995,071 | A | * | 2/1991 | Weber et al. ............. 348/14.08 |
| 5,111,391 | A | * | 5/1992 | Fields et al. .................... 705/8 |
| 5,260,986 | A | * | 11/1993 | Pershan ...................... 455/413 |
| 5,261,102 | A | * | 11/1993 | Hoffman |
| 5,530,892 | A | * | 6/1996 | Hwang ........................... 710/2 |
| 5,589,956 | A | * | 12/1996 | Morishima et al. ............ 359/15 |

(Continued)

FOREIGN PATENT DOCUMENTS

JP         404257956 A   *  9/1992

(Continued)

OTHER PUBLICATIONS

"Extensible Access Control List Mechanism", IBM Technical Disclosure Bulletin, vol. 34, Issue No. 7B, pp. 114-117, Dec. 1991.*

(Continued)

*Primary Examiner*—Hani M. Kazimi
*Assistant Examiner*—Siegfried E. Chencinski
(74) *Attorney, Agent, or Firm*—Staas & Halsey LLP

(57) ABSTRACT

A system manages resources among groups of workers that are connected to one another through a network. The system maintains the security of the resources and improves the operations of the groups.

Each group manages the rights to use resources such as windows, objects, and data belonging to the group. Each group is allowed to use only resources whose rights to use are allocated to the group. The groups may exchange the resources among them through a job monitor (2). The job monitor automatically handles the rights to use the resources among the groups according to the working conditions of the groups, procedures, and a job definition form (11). The groups independently and cooperatively carry out jobs. The system employs telephones and pagers to access the members of the groups if they are absent from predetermined locations, to improve the operations of each group.

25 Claims, 53 Drawing Sheets

U.S. PATENT DOCUMENTS 5,767,848 A * 6/1998 Matsuzaki et al.
5,797,129 A    8/1998 Rohan
5,826,040 A * 10/1998 Fargher et al. .................. 705/8

FOREIGN PATENT DOCUMENTS

| | | |
|---|---|---|
| JP | 04344955 | 12/1992 |
| JP | 05127969 A | 5/1993 |
| JP | 06214863 A | 8/1994 |
| JP | 06348470 A | 12/1994 |
| JP | 07319820 | 12/1995 |

OTHER PUBLICATIONS

Rapoza, "ManagePro 3.0 project manager takes the work out of teamwork . . . ", PC Week, v12, n19, p. 74(2), May 15, 1995, Dialog file 148, Accession No. 07867165.*

Rapoza, "ManagePro 3.0 project manager takes the work out of teamwork . . . ", PC Week, v12, n19, p. 74(2), May 15, 1995, Dialog ☐☐file 148, Accession No. 07867165.*

Castrucci, Steve; Glen, Ron; Making Teamwork Work; Jan. 1993; I.T. Magazine; v25n1; pp. 21-27.*

Heck, Mike; High-end project managers; Feb. 1, 1993; InfoWorld; v15n5; pp. 59-70.*

Okada Yoshihiko et al., "Process and Communication Models for Distributed Software Development," IPSJ SIG Notes Contents, vol. 91, No. 106 (91-SE-82)(Dec. 3, 1991) and English Abstract thereof.

Koichiro Ochimizu et al., "Design of a Software Development Environment JIZAI for Distributed Software Development," Technical Report of the Institute of Electronics, Information and Communication Engineers, vol. 94, No. 135 (SS 94-18) (Jul. 1994) and English Abstract thereof.

Japanese language Office Action mailed May 14, 2002 in the Japanese Patent Application corresponding to the above-referenced patent application.

Japanese Office Action dated Nov. 1, 2005 for Japanese Application No. 2002-19389 corresponding to the present above-identified pending US patent application, including English translation thereof, total 5 pages.

* cited by examiner

Fig.2
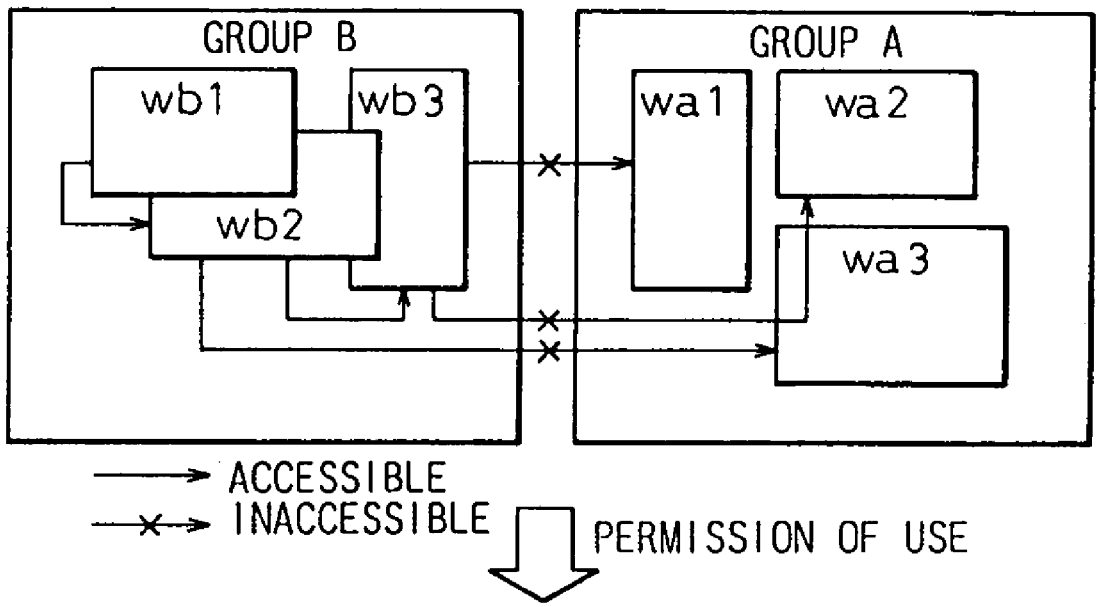
→ ACCESSIBLE
×→ INACCESSIBLE
⇓ PERMISSION OF USE
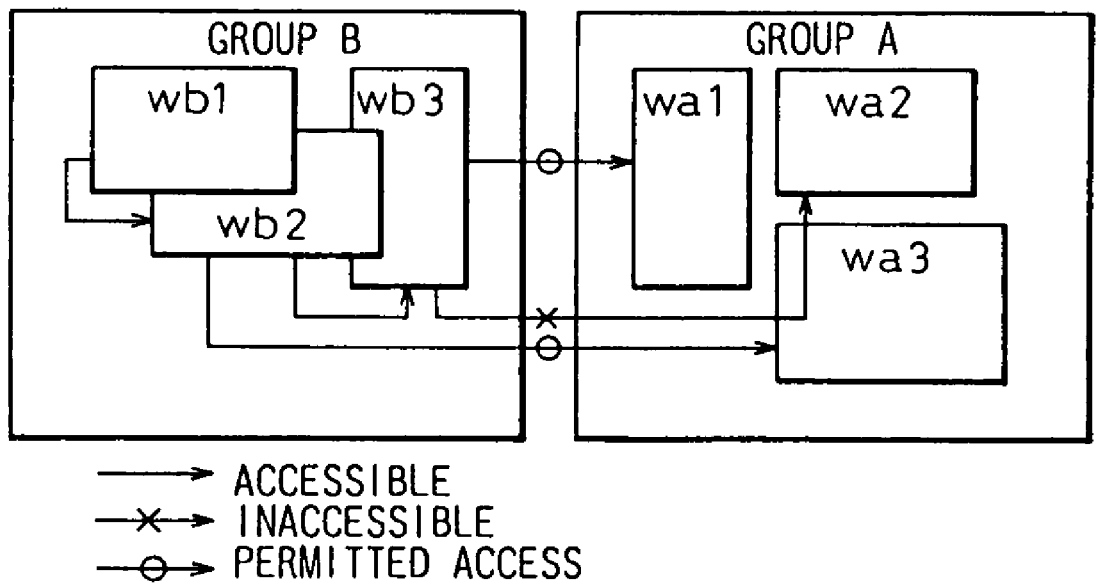
→ ACCESSIBLE
×→ INACCESSIBLE
—○→ PERMITTED ACCESS

Fig. 8

```
DATE OF START: stdate
DATE OF COMPLETION: spdate
GROUP: A

PROCEDURE
   JOB: A1
      LINK:***
      WORKER: 1,2,...,n
      DATE OF START: stdate-A1
      DATE OF COMPLETION: spdate-A1
      WINDOW:
      OBJECT:
      DATA:
   JOB: A2
      LINK:***
      WORKER: 1,2,...,n
      DATE OF START: stdate-A2
      DATE OF COMPLETION: spdate-A2
      WINDOW:
      OBJECT:
      DATA:
      .
      .
      .
   JOB: An
      LINK:***
      WORKER: 1,2,...,n
      DATE OF START: stdate-An
      DATE OF COMPLETION: spdate-An
      WINDOW:
      OBJECT:
      DATA:
```

Fig.9

```
use: GROUP A(JOB A1),···,GROUP Z(JOB Z1)
member: GROUP A(JOB A1)[WORKER 1,···,WORKER n]
        GROUP B(JOB B1)[WORKER 1,···,WORKER n]
           ⋮
        GROUP Z(JOB Z1)[WORKER 1,···,WORKER n]
start: stdate
stop: spdate PROCEDURE:
   for(time N week)
    if(status: GROUP A(JOB A1)=all)then exit
    if(status: GROUP B(JOB B1)=all)then exit
         ⋮
       GROUP A(JOB A1):
         resource([window1,···,windowk],
                  [object1,···,objectL],
                  [data1,···,dataM])
       GROUP B(JOB B1):
         resource([window1,···,windowk],
                  [object1,···,objectL],
                  [data1,···,dataM])
           ⋮
    end for
     loop GROUP A(JOB A1)status: all endLoop
     loop GROUP B(JOB B1)status: all endLoop
     delete GROUP A(JOB A1):
         resource([window1,···,windowk],
                  [object1,···,objectL],
                  [data1,···,dataM])
      delete GROUP B(JOB B1):
         resource([window1,···,windowk],
                  [object1,···,objectL],
                  [data1,···,dataM])
            ⋮
       for(time N week)
            ⋮
    END OF JOBS
```

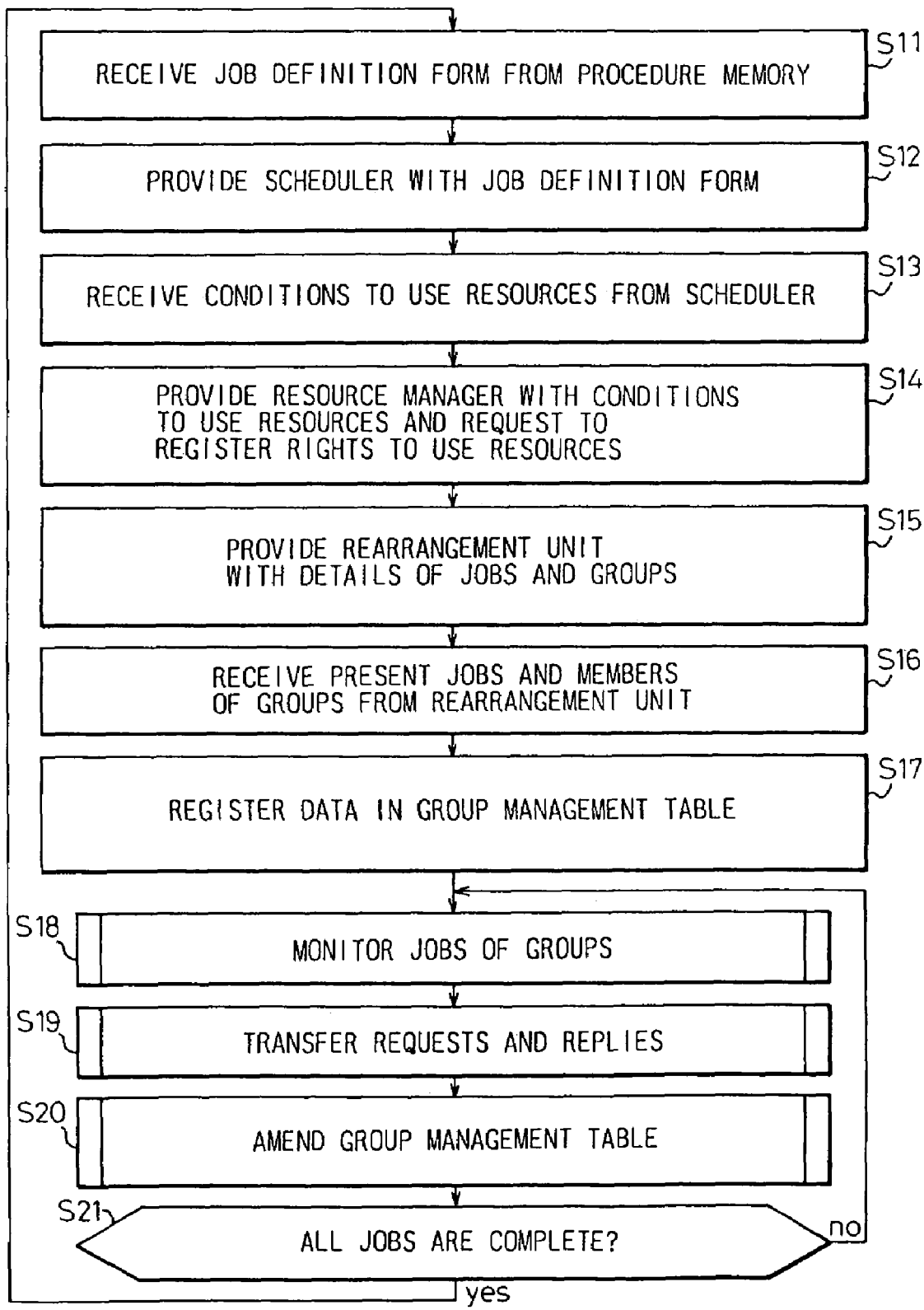

Fig.13

| WINDOW | NUMBER | GROUP (JOB) | FLAG | GROUP (JOB) | FLAG | ... | ~21 |
|---|---|---|---|---|---|---|---|
| OBJECT | --- | --- | --- | --- | --- | --- | |
| --- | ---- | ---- | ---- | ---- | ---- | ---- | |
| DATA FILE | ----- | ----- | ----- | ----- | ----- | ----- | |

| FLAG | |
|---|---|
| 0 | UNUSED |
| 1 | IN USE |
| 3 | IN USE AND UPDATED DATA FILE |
| 4 | AVAILABLE FOR ANOTHER GROUP |
| 5 | BELONGING TO ANOTHER GROUP BUT AVAILABLE |

Fig. 14

| GROUP (JOB) | NUMBER | WORKER | WORKER | WORKER | | 41 |
|---|---|---|---|---|---|---|
| | | | | | | |
| | | | | | | |
| ----- | ----- | ----- | ----- | ----- | ----- | ----- |

Fig.15(A)

| GROUP(JOB) | WINDOW | OBJECT | DATA | CONDITIONS |
|---|---|---|---|---|
| | | | | |
| | | | | |
| ⋮ | ⋮ | ⋮ | ⋮ | ⋮ |

WINDOW INFORMATION
(WINDOW ENVIRONMENT(SIZE,MENU,ETC.))
WINDOW ACTIVATION FILE

OBJECT INFORMATION
(OBJECT ACTIVATION STYLE,...)
OBJECT ACTIVATION FILE

DATA ATTRIBUTE INFORMATION
(DATA TYPE(READ-ONLY,FORMAT,...))
DATA FILE

Fig.15(B)

| CONDITIONS | | |
|---|---|---|
| WINDOW CONDITIONS | OBJECT CONDITIONS | DATA STORAGE CONDITIONS |

Fig.15(C)

0: UNUSED
1: IN USE
2: EXCLUSIVE USE
3: IN USE,PARTLY AVAILABLE FOR ANOTHER GROUP

Fig.15(D)

0: NOT STORED
1: COMPLETELY PROCESSED
2: INTERIM DATA STORED
4: REQUESTED DATA
5: STORED REQUESTED DATA
6: PROCESSING REQUESTED DATA

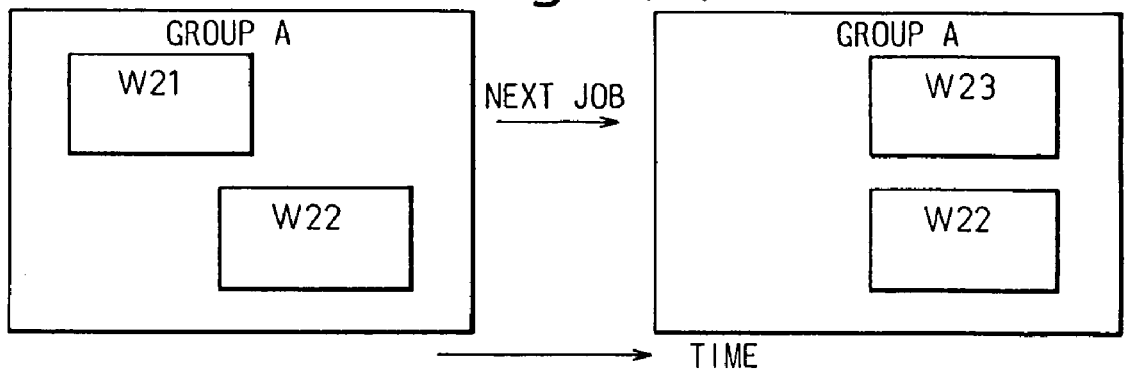
Fig.19(A)
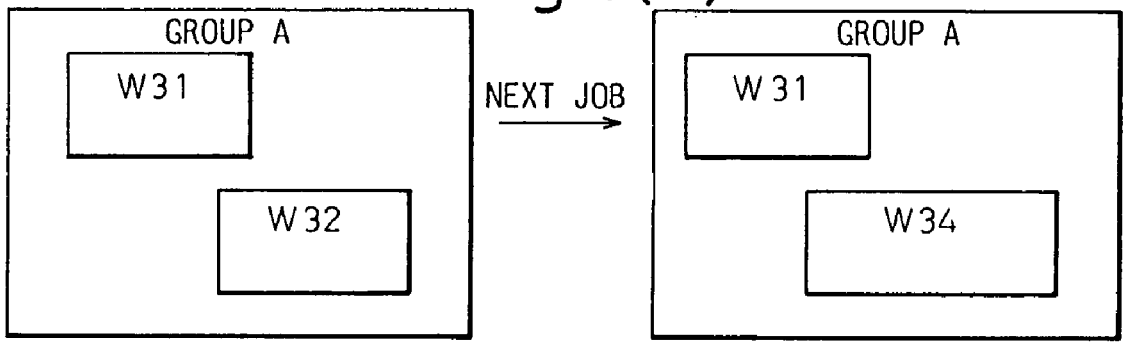
Fig.19(B)
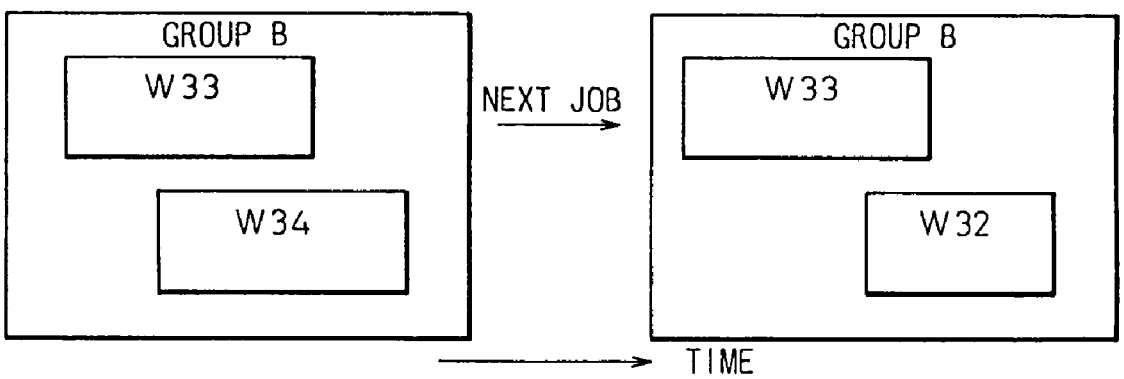
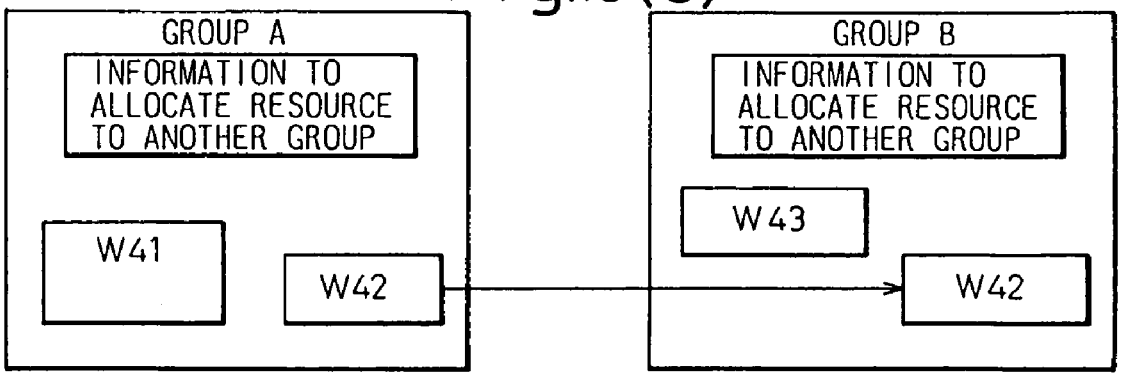
Fig.19(C)

Fig. 25(A)

| GROUP (JOB) | NUMBER OF MEMBERS | MEMBER | --- | WINDOW | OBJECT/COMMAND | DATA | MONITOR/VOICE | CONTACT | WORK CONDITIONS |
|---|---|---|---|---|---|---|---|---|---|
| | | | --- | | | | | | |
| | | | --- | | | | | | |
| | | ... | ... | | ... | ... | ... | ... | ... |

Fig. 25(B)

| WINDOW | OBJECT/COMMAND | DATA STORAGE | CONTACT | WORK CONDITIONS | MONITOR CAMERA OPERATION | MONITOR CAMERA INPUT | VOICE INPUT/OUTPUT |
|---|---|---|---|---|---|---|---|

Fig. 25(C)

```
 0: UNUSED
 1: IN USE
 2: EXCLUSIVE USE
 3: EXCLUSIVE USE BY SPECIFIC MEMBERS
 4: EXCLUSIVE USE BY SPECIFIC MEMBER
 5: IN USE, AVAILABLE FOR ANOTHER GROUP
 6: BEING CHECKED
 7: BEING CHECKED WITH ALL MEMBERS
 8: USED UNDER PERMISSION OF ALL MEMBERS
 9: BEING CHECKED WITH SPECIFIC MEMBERS
10: BEING CHECKED WITH SPECIFIC MEMBER
```

Fig. 25(D)

```
0: NOT STORED
1: COMPLETELY PROCESSED
2: INTERIM DATA STORED
3: STORAGE PROHIBITED, READ ONLY
4: STORAGE PROHIBITED, READABLE IF AGREED BY ALL MEMBERS
5: STORAGE PROHIBITED, READABLE IF AGREED BY SPECIFIC MEMBER
6: REQUESTED DATA
7: REQUESTED DATA STORED
8: PROCESSING REQUESTED DATA
```

Fig. 26(A)

```
0: UNUSED
1: CONTACTING
2: CONTACTING WITH ALL MEMBERS
3: NOTIFIED
4: NOTIFIED TO ALL MEMBERS
1X: PORTABLE TELEPHONE
2X: PAGER
3X: PERSONAL COMPUTER COMMUNICATION
4X: OTHER COMMUNICATIONS
```

```
0: UNUSED
1: START MOVING CAMERA
2: MOVING CAMERA
3: POSITIONED
1X: MOVING RIGHT
2X: MOVING LEFT
3X: MOVING UP
4X: MOVING DOWN
```

Fig. 26(C)

```
0: UNUSED
1: POSITION ERROR
2: NO INPUT
3: INPUTTING
```

Fig. 26(D)

```
0: UNUSED
1: REQUEST FOR VOICE MESSAGE
2: REQUEST FOR REGISTRATION OF VOICE MESSAGE
3: SPECIFYING VOICE MESSAGE DESTINATION
4: CHECKING VOICEPRINT
```

Fig.27

```
WINDOW INFORMATION
(OS, CPU, WINDOW ENVIRONMENT(SIZE, MENU))
WINDOW ACTIVATION FILES(OS, CPU)
```

Fig.28

```
OBJECT/COMMAND INFORMATION
(OS, CPU, OBJECT ACTIVATION FORMAT)
OBJECT ACTIVATION FILES(OS, CPU)
```

Fig.29

```
INFORMATION ABOUT MONITOR AND VOICE
(MEMBER, LOCATION, POSITION(DIRECTION, ANGLE), TYPE(VOICE))
OPERATING FILES FOR MONITOR AND VOICE
```

Fig.30

```
CONTACT INFORMATION
(NAME, LOCATION, TELEPHONE NUMBER, AND MESSAGE CODE OF EACH MEMBER)
CONTACT OPERATING FILES
```

Fig.31

```
DATA ATTRIBUTE INFORMATION
(DATA TYPE(READ-ONLY, FORMAT, TYPE(DYNAMIC IMAGE, VOICE))
DATA FILES
```

Fig.32(A)

| WINDOW | NUMBER | GROUP (JOB) | FLAG | GROUP (JOB) | FLAG | ------ |
|---|---|---|---|---|---|---|
| ⋮ | ⋮ | ⋮ | ⋮ | ⋮ | ⋮ | |
| COMMAND/ PROGRAM | | | | | | ------ |
| ⋮ | ⋮ | ⋮ | ⋮ | ⋮ | ⋮ | |
| DATA | | | | | | ------ |
| ⋮ | ⋮ | ⋮ | ⋮ | ⋮ | ⋮ | ⋮ |

Fig.32(B)

| FLAG | |
|---|---|
| 0 | UNUSED |
| 1 | IN USE |
| 3 | UPDATED DATA/OBJECT/COMMAND/WINDOW IN USE |
| 5 | CREATING NEW FILE FROM PRESENT DATA/OBJECT/COMMAND/WINDOW |
| 7 | DIFFERENCE ADDED TO PRESENT DATA/OBJECT/COMMAND/WINDOW |
| 8 | ASKING PERMISSION OF ANOTHER GROUP |
| 9 | PERMITTED WINDOW/DATA/OBJECT/COMMAND OF ANOTHER GROUP |
| 18 | ASKING PERMISSION OF SPECIFIC MEMBER OF ANOTHER GROUP |
| 28 | ASKING PERMISSION OF ALL MEMBERS OF ANOTHER GROUP |
| 38 | ASKING PERMISSION OF SPECIFIC MEMBERS OF ANOTHER GROUP |

Fig.33

| GROUP (JOB) | NUMBER | MEMBER | - - - - - - - | MEMBER |
|---|---|---|---|---|
| - - - - | - - - - | - - - - | - - - - - | - - - - - |
| | | | | |

| MEMBER | GROUP (JOB) | NUMBER | TAG | WINDOW | PERIOD | |
|---|---|---|---|---|---|---|
| ------ | ------ | ------ | ------ | ------ | ------ | ------ |

Fig.34(A)

| TAG | |
|---|---|
| 1 | WINDOW |
| 2 | OBJECT/COMMAND |
| 3 | DATA |

Fig.34(B)

| PERIOD | AVAILABLE PERIOD |
|---|---|

| GROUP (JOB) | NUMBER | TAG | WINDOW | PERIOD | |
|---|---|---|---|---|---|
| ------- | ------- | ------- | ------- | ------- | ------- |

Fig.35(B)

| TAG | |
|---|---|
| 1 | WINDOW |
| 2 | OBJECT OR COMMAND |
| 3 | DATA |

Fig.35(C)

| PERIOD | AVAILABLE PERIOD |
|---|---|

Fig. 36(A)

```
START OF FIRST JOB: START DATE
END OF LAST JOB: END DATE
GEOUP: C

PROCEDURE
  JOB: DEVELOPMENT A
  LINK: ***
  DATE OF START: start-1
  DATE OF COMPLETION: end-1
  WORKER: 1,2,...,m
  CONTACT ADDRESS
    WORKER 1: PRIORITY,CALL,PORTABLE TELEPHONE(TELEPHONE NUMBER)
    WORKER 2: NO PRIORITY,PAGER,PORTABLE DEVICE
    .........
    WORKER m: ******
    WINDOW: ***** (PERMISSION,PERIOD,PERMISSION PROCEDURE)
    .........
  OBJECT/COMMAND: ***** (PERMISSION,PERIOD,PERMISSION PROCEDURE)
    .........
  DATA: ***** (PERMISSION,PERIOD,PERMISSION PROCEDURE)
    .........
  CONTACT: POSSIBLE
  NUMBER: k
  WORKER: 3,8
  MONITOR: CAMERA WITH SENSOR,VOICE
```

```
JOB: DEVELOPMENT B
    LINK: ***
    DATE OF START: start-2
    DATE OF COMPLETION: end-2
    WORKER: 1,2,...,n
    CONTACT ADDRESS
      WORKER 1: NO PRIORITY,PAGER
      WORKER 2: PRIORITY,CONTACT,PORTABLE TELEPHONE (TELEPHONE NUMBER)
      ..............................
      WORKER n: ******
    WINDOW: ..............
    OBJECT/COMMAND: ...........
    DATA: ..............
    CONTACT:POSSIBLE
    ..............

JOB: DEVELOPMENT J
    LINK: ***
    ......
    MONITOR: CAMERA WITH SENSOR
```

```
START OF DEVELOPMENT PROCESS: [
START: start of date
END: END of date
USE: GROUP 1(DEVELOPMENT A1),…,GROUP 999(DEVELOPMENT NAME)
member: GROUP 1(DEVELOPMENT A1)[WORKER: 1,2,…,m]
        GROUP 1(DEVELOPMENT B1)[…………]
        ……………………………………………
        GROUP 2(DEVELOPMENT A1)[WORKER: ……]
        GROUP 2(DEVELOPMENT B1)[WORKER: ……]
        ……………………………………………
        GROUP n(DEVELOPMENT A1)[WORKER: ……]
        ……………………………………………
PROCESS:
  create GROUP 1(DEVELOPMENT A1):
  resource([window1,…,windowP],
          [object1,command1,…,commandL],
          [data1,…,dataN])
  create GROUP 2(DEVELOPMENT A1):
  resource([window1,…,windowS],
          [command1,…object0,commandK],
          [data1,…,dataJ])
     ………
```

```
PROCESS 1:                                                                    *2
   for(time N week)
   if(status: GROUP 1(DEVELOPMENT A1)=end)then exit: PROCESS 1
   if(status: GROUP 2(DEVELOPMENT B1)=end)then exit: PROCESS 1
   ...
      GROUP 1(DEVELOPMENT A1):
         resource([window1,...,windowP],
                  [object1,command1,...,commandL],
                  [data1,...,dataN])
      GROUP 2(DEVELOPMENT A1):
         resource([window1,...,windowS],
                  [command1,...,objectO,commandK],
                  [data1,...,dataJ])
            ...........
            end for PROCESS 1
   wait((GROUP 1 AND GROUP 2)status=end))
   delete GROUP A(DEVELOPMENT A1):
      resource([window1,...,windowP],
               [object1,command1,...,commandL],
               [data1,...,dataN])
   delete GROUP 2(DEVELOPMENT A1):
      resource([window1,...,windowS],
               [command1,...,object1,commandK],
               [data 1,...,data J])
         ...........
   create GROUP 1(DEVELOPMENT B1):
      resource(.....
         ........................
PROCESS 2:
   for(time M week)
      ................
         end for PROCESS 2
         ................
]
```

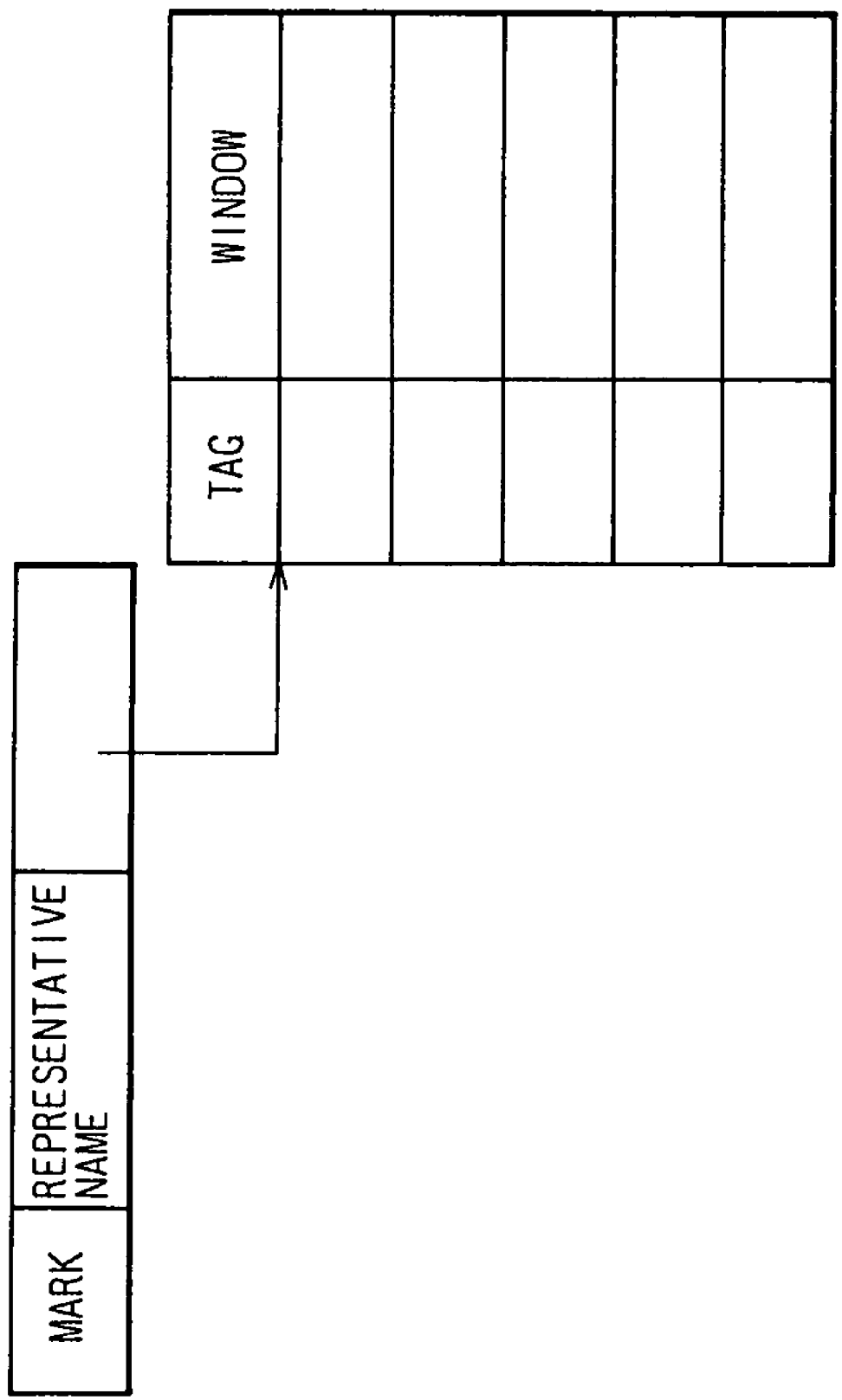

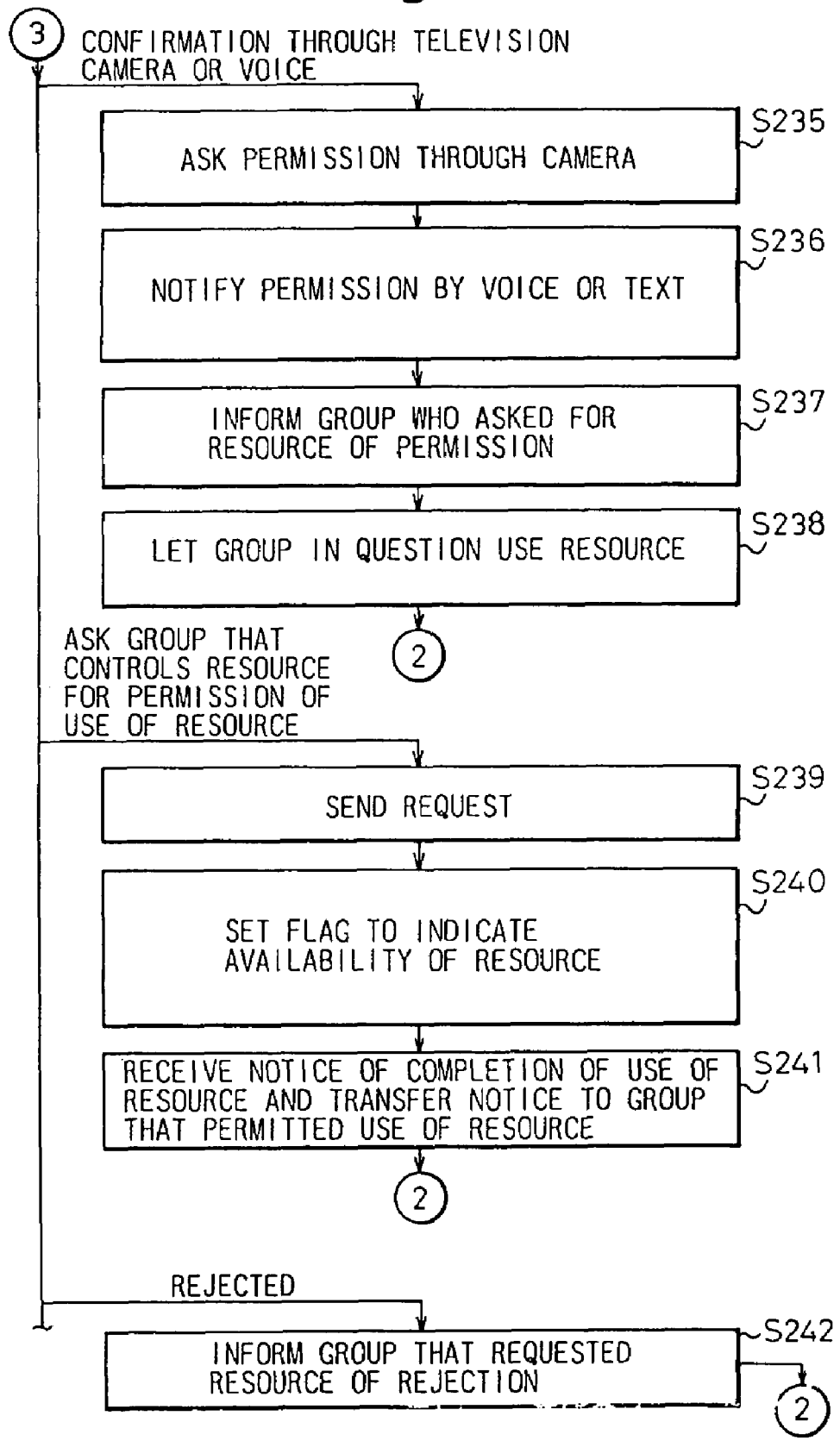

SYSTEM FOR MANAGING RESOURCES USED AMONG GROUPS

This application is a continuation of application Ser. No. 08/605,638, filed Feb. 22, 1996, now abandoned.

BACKGROUND OF THE INVENTION

1. Field of the Invention

The present invention relates to an object-oriented system for managing resources among groups connected to one another through a network.

2. Description of the Related Art

High-performance, high-speed computers require an object-oriented or distributed network. The network must provide each user with easy operation. The network involves groups of users that use and share resources such as objects, programs, and data. It is important for the network to have a management system to maintain the security of the resources.

Restricting resources to each group will improve the security of the resources but will spoil the effectiveness thereof. Sharing the resources among the groups will improve the effectiveness thereof but will deteriorate the security of them. If the groups are allowed to use the same name on objects, an object prepared by one of the groups may be destroyed by another. Accordingly, it is important to provide a system to maintain the security of resources that are used among the groups.

There are groupware programs to handle jobs group by group, or to share jobs among groups through a network. There are no groupware programs that let one of the groups create an object and let the groups share the object. To realize this, a worker must be attached to several of the groups, to access and transfer the object among the groups.

There is no prior art that employs visual and auditory means to share and maintain the security of resources among groups of workers in real time. When a worker belonging to a first group needs data prepared by a second group, the worker of the first group must call and ask a worker of the second group to transfer the data to the first group. This is ineffective because it takes a long time.

To transfer data between groups of workers, a prior art employs an electronic mail system or magneto-optic disks instead of real-time visual means such as television systems. This prior art is troublesome.

If the security of resources is strictly maintained, it will be difficult to share the resources among groups of workers, to thereby deteriorate the workability of the groups. To solve this problem, the groups may be rearranged and the security of the resources may temporarily be released. This, however, disturbs the correct management of the workers and resources.

In this way, improving the sharing of resources and the efficiency of jobs deteriorates the security of the resources, and manually managing the resources and jobs causes trouble. To improve the workability of groups of workers, it is important to automate the management of resources, the rearrangement of the groups, and the transfer of the resources among the groups according to job procedures and conditions. Each group must independently control its own resources while flexibly shifting the resources among the groups.

SUMMARY OF THE INVENTION

An object of a first aspect of the present invention is to allow jobs to be efficiently carried out by groups of workers through a network and maintain the security of resources handled by the groups. The first aspect employs a job definition form that defines the jobs, objects, and procedure of each group. According to the job definition form, the first aspect dynamically controls the right to use resources including windows, objects (programs), and data among the groups. To improve the workability of each group, the first aspect:

(1) enables a first group to use a window controlled by a second group upon receiving permission of the second group;

(2) enables a first group to transfer its own data to a second group and let the second group process the data; and (3) changes the attributes of resources controlled by the groups when jobs are complete, when the workers are shifted among the groups, or when the groups are rearranged.

Strictly maintaining the security of resources deteriorates the efficiency of sharing the resources and the workability of the groups. Restricting workers to work positions in their groups may improve the workability of the groups but unnecessarily remove the freedom of the workers.

To solve this problem, a second aspect of the present invention employs a pager or mobile telephone to automatically call a member of a given group to obtain permission to use a resource belonging to the group. The second aspect is capable of strictly maintaining the security of resources while enabling the groups to carry out their jobs in real time.

The present invention provides a system for managing resources including windows, objects, and data among groups of workers that carry out jobs using computers. The system has a resource manager for managing resources allocated to each of the groups; job monitor for monitoring the jobs carried out by the groups and maintaining a security of the resources allocated to the groups; and a scheduler for scheduling the jobs of each group according to a procedure specific to the group and information provided by the job monitor.

The system has a procedure memory for storing a job definition form that defines the period, members, processes, and resources allocated to each job carried out by each group. The resource manager, job monitor, and scheduler exchange the rights to use the resources among the groups according to the job definition form.

The system has a rearrangement unit for managing and rearranging the members and resources of the groups according to the progress of the jobs. The job monitor monitors the jobs and resources of the groups according to information from the rearranging means.

The system has an emergency group that is allowed to access every resource of every group. The job monitor permits any request from the emergency group for accessing a resource.

The job monitor has a unit for transferring a resource from one of the groups to another, or automatically changing the resources of any one of the groups according to a procedure.

The system has a unit for using a telephone to call and ask, when a first group makes a request to use a resource of a second group, the second group for permission to use the resource.

The system has a unit for using a pager to call and ask, when a first group makes a request to use a resource of a second group, the second group for permission to use the resource.

The system has a unit for using a notebook computer, an electronic notepad, or a workstation through a wide-area network, a personal computer communication network, or a wireless network to call and ask, when a first group makes a request to use a resource of a second group, the second group for permission to use the resource.

The system has a visual I/O device such as a television camera and an audio I/O device such as a microphone to call and ask, when a first group makes a request to use a resource of a second group, the second group for permission to use the resource.

The system has an input unit such as a sensor or a transmitter attached to a member of a second group, for identifying and locating the member, and a positioner such as a television camera for photographing the member. When a first group makes a request to use a resource of the second group, the input unit and positioner are used to directly ask the member of the second group for permission to use the resource.

The job monitor has a unit for holding the schedules of the jobs of the groups and exchanging the jobs among the groups.

The job monitor has a unit for limiting the location, period, and group to handle a resource, to thereby strictly maintain the security of the resource.

The job monitor has a unit for indicating whether permission to use a resource of a group is granted upon approval of all or part of the members of the group.

The job monitor has a unit for adding the name of a group to which a resource belongs to the name of the resource so that the groups may have resources having the same name.

The job monitor has a unit for allocating a representative name to a set of resources and identically handling the resources under the representative name.

The system has a virtual-reality unit attached to a member of a group, to identify the location of the member.

The system has a head-mount display worn by a member of a group so that the member may give permission to use a resource of the group.

The input unit of the system is provided with a password or an ID, to prevent an illegal access to the input unit.

BRIEF DESCRIPTION OF THE DRAWINGS

FIG. 2 shows windows whose access rights are exchanged between groups;

FIG. 8 shows a request definition form;

FIG. 9 shows a job definition form;

FIG. 10 is a flowchart showing steps taken by a job monitor;

FIG. 13 shows a group management table;

FIG. 14 shows a member table;

FIGS. 15A to 15D show resource management tables;

FIGS. 19A to 19C explain locking windows;

FIGS. 25A to 25D show resource management tables;

FIGS. 26A to 26D are continuation of FIG. 25;

FIG. 27 shows a window memory;

FIG. 28 shows a program/command memory;

FIG. 29 shows a monitor information memory;

FIG. 30 shows a contact address memory;

FIG. 31 shows a data memory;

FIGS. 32A and 32B show group management tables;

FIG. 33 shows a member table;

FIGS. 34A to 34C show member-based emergency tables;

FIGS. 35A to 35C show group-based emergency tables;

FIGS. 36A and 36B show job definition form;

FIGS. 37A and 37B show overall definition form;

FIG. 38 shows resources controlled under a representative name by a resource manger;

FIG. 54 is a continuation of FIG. 53.

DESCRIPTION OF THE PREFERRED EMBODIMENTS

Figure 1:
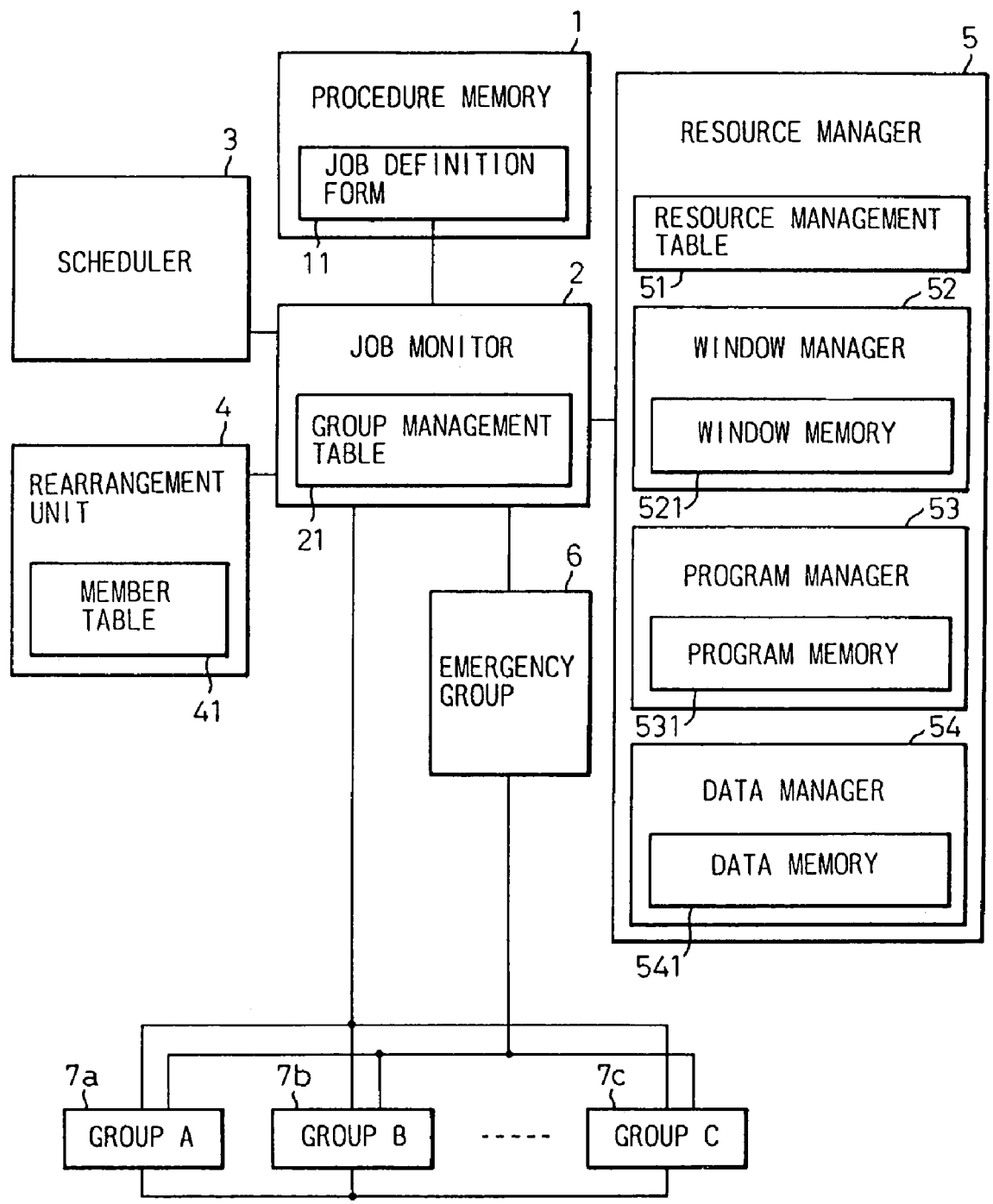
FIG. 1 is a block diagram showing a first principle of the present invention.

FIG. 1 shows a system for managing resources among groups that are connected to one another through a network, according to a first principle of the present invention. In this specification, the "resource" may be a window, a program (object), a command, or data. The system has a procedure memory 1, a job monitor 2, a scheduler 3, a rearrangement unit 4, a resource manager 5, an emergency group 6, and groups 7a, 7b, and 7c. Each group consists of workers, i.e., members. The workers of each group are identified by a group attribute and are related to terminals or workstations, respectively.

The procedure memory 1 stores and updates a job definition form 11 that defines the period, members, processes, windows, objects, and data of each job of each group. The job definition form 11 is used to share resources among the groups.

The job monitor 2 controls communications among the procedure memory 1, scheduler 3, rearrangement unit 4, and resource manager 5 and manages resources among the groups 7. The job monitor 2 monitors the job processing states of the groups 7 and controls communications, resources, jobs, and members among the groups according to a group management table 21.

The scheduler 3 receives the job definition form 11 from the job monitor 2 at the start of jobs and returns the conditions of the resources used by the groups. The scheduler 3 manages the progress of the jobs of the groups according to schedules prepared for the groups according to the job definition form 11 and informs the job monitor 2 of work conditions such as excess work hours.

The rearrangement unit 4 receives the start and end hours of each job, the name of each group, the name of each job, and the members of each group from the job monitor 2 and provides the job monitor 2 with the names of groups that are working, the names of jobs that are being processed, and the present members of the groups. The rearrangement unit 4 changes members in a member table 41 according to information from the job monitor 2. When the job monitor 2 informs the rearrangement unit 4 that any one of the groups has completed or changed its job, the rearrangement unit 4 rearranges the table 41 accordingly.

The resource manager 5 has a resource management table 51 for managing the rights to use resources according to information from the job monitor 2, a window manager 52 for controlling windows, a program manager 53 for controlling programs, and a data manager 54 for controlling data. The window manager 52 has a window memory 521 for storing the windows, the program manager 53 has a program memory 531 for storing the programs, and the data manager 54 has a data memory 541 for storing the data.

The emergency group 6 is allowed to access every resource of every group. In response to a trouble notice from the job monitor 2, the emergency group 6 tries to solve the trouble.

Each of the groups connected to the network independently carries out a job. Each group is allowed to access its own resources but is prohibited from accessing resources of the other groups without permission. The resources of a given group are locked against the other groups, to maintain the security of the resources.

When a group needs a resource of another group, the group sends a request to the job monitor 2. The job monitor 2 determines whether or not the request is acceptable according to the job definition form 11. If it is acceptable, the job monitor 2 requests the resource manager 5 to change the right to use the resource so that the group that made the request may temporarily use the resource. This technique improves the workability of each group.

When a group completes a job or switches a job to another, the job monitor 2 automatically switches the resources of the group to others that are necessary for the new job. The members of the group, therefore, can smoothly continue their work.

When trouble happens, the emergency group 6 is ready to access every resource of every group, to deal with the trouble.

Figure 22:
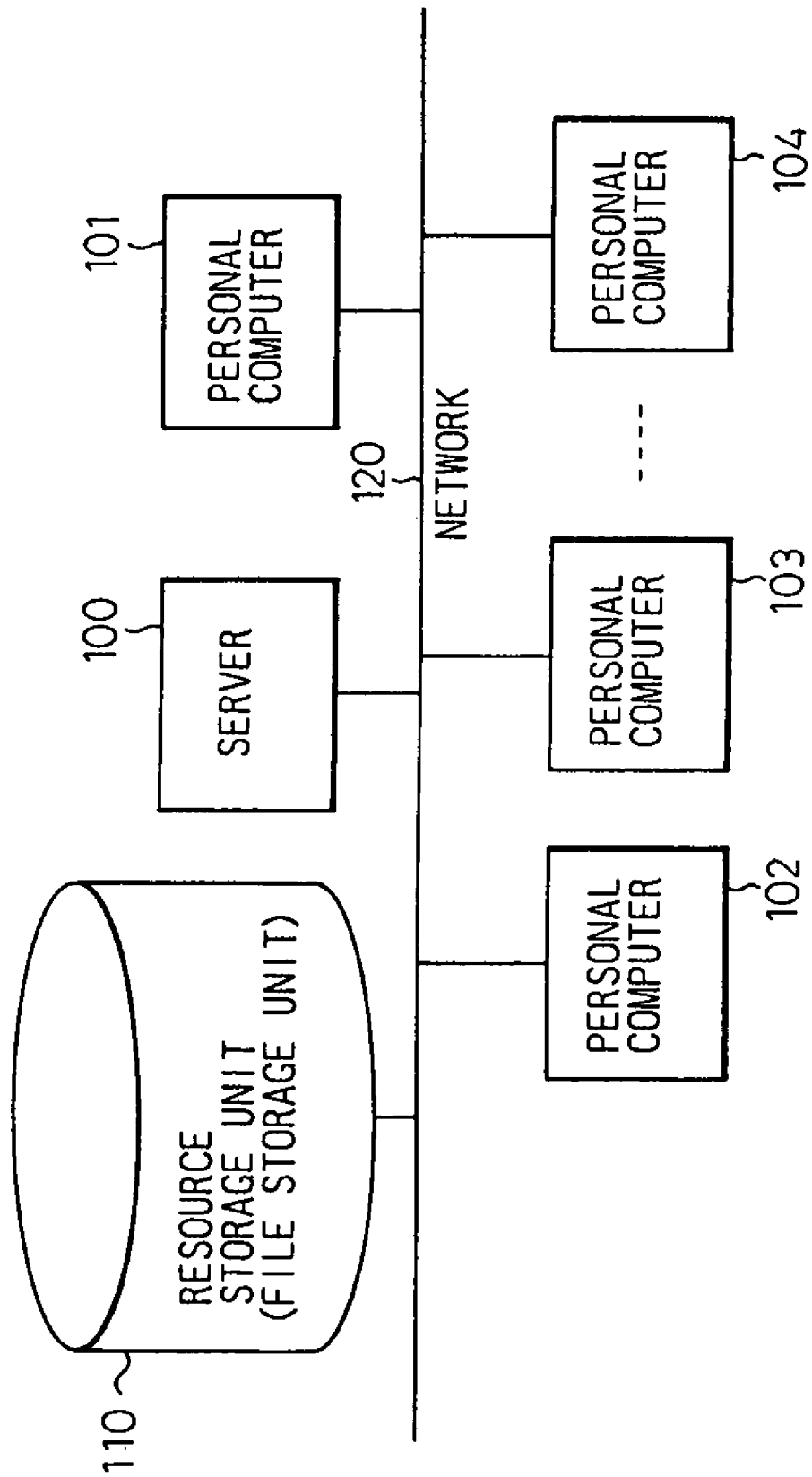
FIG. 22 shows a system according to an embodiment of the present invention.
Figure 23:
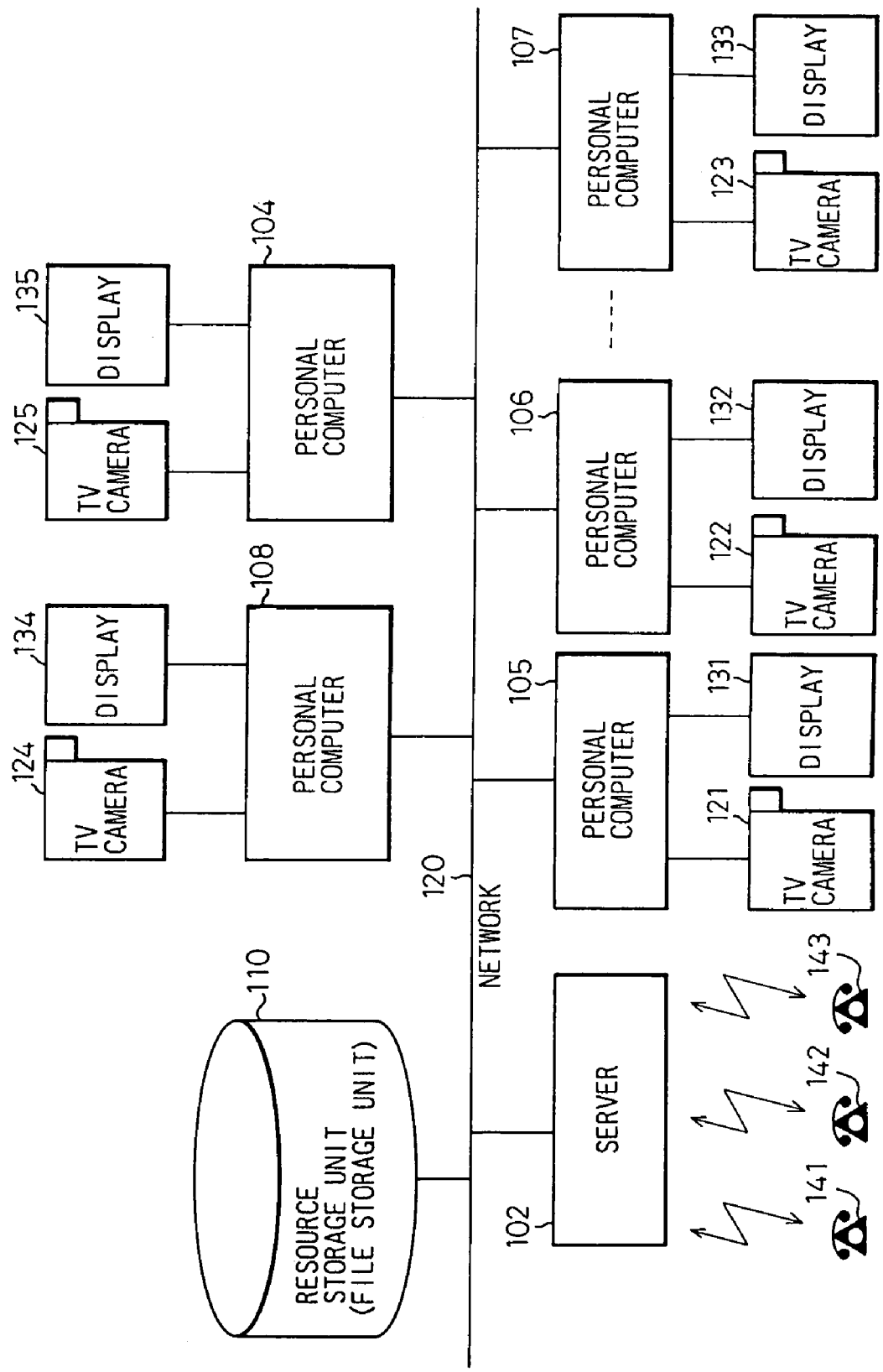
FIG. 23 shows a system according to an embodiment of the present invention.

FIG. 23 shows a system for managing resources among groups that are connected to one another through a network, according to the second aspect of the present invention. This system includes telephones, television cameras, displays, etc., in addition to the system of FIG. 22.

Figure 24:
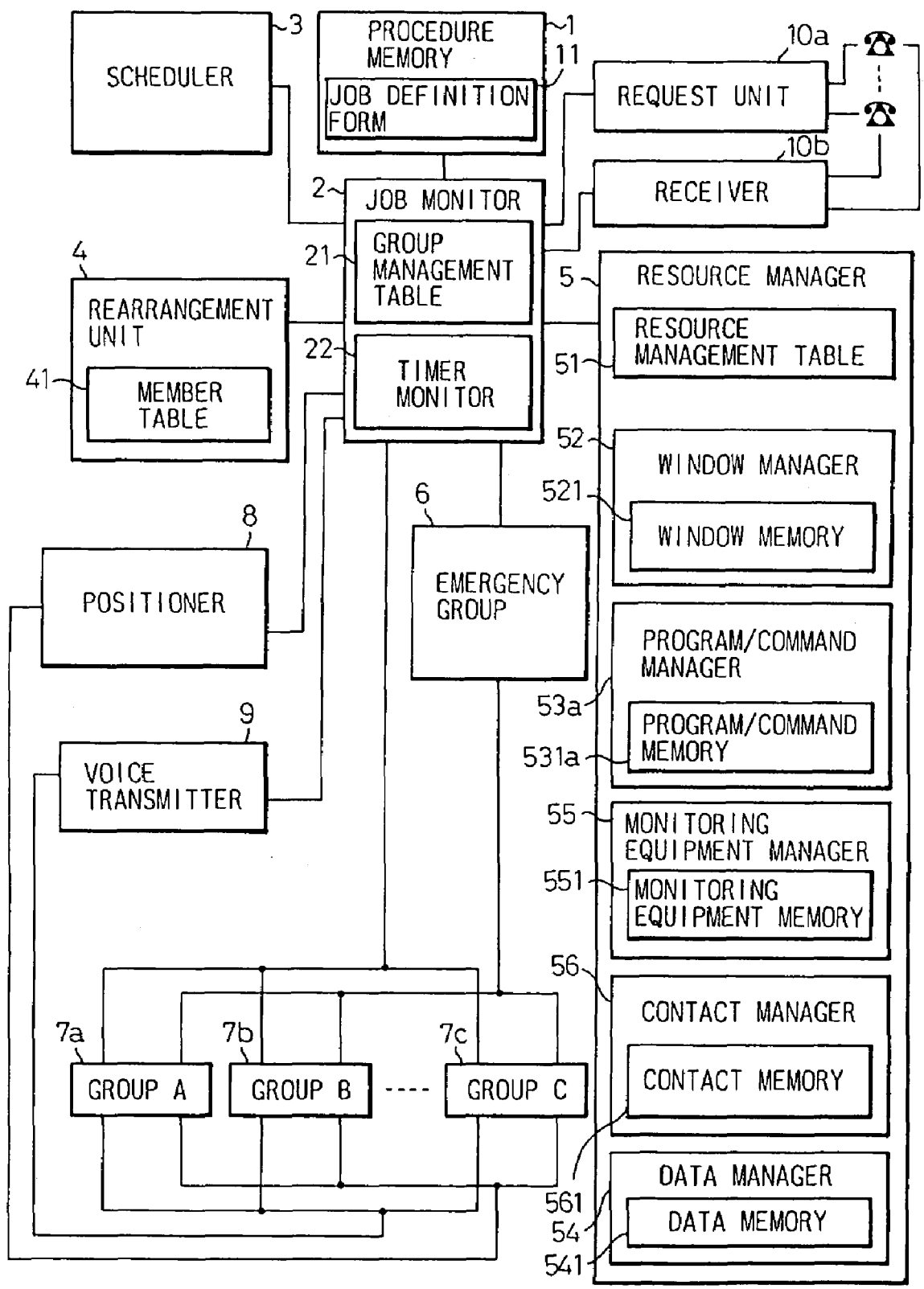
FIG. 24 shows a second principle of the present invention.

FIG. 24 shows a system for managing resources among groups that are connected to one another through a network, according to a second principle of the present invention. Compared with the first principle of FIG. 1, the second principle additionally has a timer monitor 22, a program/command memory 531a, a monitoring equipment manager 55, a contact manager 56, a positioner 8, a voice transmitter 9, a request unit 10a, and a receiver 10b.

In FIG. 24, a procedure memory 1 stores a job definition form 11. A job monitor 2 monitors resources according to a group management table 21. The timer monitor 22 is used to manage work hours. A job of a given group is changed to another according to the job definition form 11. When a member of a first group must use a resource of a second group and when a member of the second group who controls the resource is absent at a work location in the second group, the request unit 10a sends a message to a telephone, a pager, or a portable computer to find and ask the member of the second group for permission to use the resource. The receiver 10b receives a message, which indicates whether or not the permission is granted, from the member of the second group.

The positioner 8 is used to visually locate a member of a group. A voice transmitter 9 enables a member of a group to communicate with a member of another group. A resource manager 5 manages the resources of the groups.

The resource manager 5 has a resource management table 51, a window manager 52 for managing a window memory 521, a program/command manager 53a for managing the program/command memory 531a, the monitoring equipment manager 55 for managing a monitoring equipment memory 551 for storing the location of each member and messages, the contact manager 56 for managing a contact memory 561 for storing the contact addresses of the members of the groups, and a data manager 54 for managing a data memory 541.

The window memory 521 stores window information and window activation files to let the members of the groups use windows. The window memory 521 also has information to form proper environment for a given window or operating system. The program/command memory 531a, monitoring equipment memory 551, contact memory 561, and data memory 541 store respective information.

The job monitor 2 manages the group management table 21, the member table 41, a member-based emergency table, and a group-based emergency table. With these tables, the job monitor 2 limits the time to use resources, periods to use resources, and members to use resources and holds the members and groups that are using resources, to maintain the security of the resources.

Each member of each group may have an ID or a password, to prevent an illegal access to resources. For this purpose, members and periods to process resources must be clarified and properly scheduled. This is achieved by using the job definition form 11 that controls the job of each group and an overall definition form that controls the jobs of all groups. Each schedule must be made according to the job definition forms.

According to the second aspect of the present invention, each of the groups connected to the network independently carries out a job. Each group is allowed to access its own resources but is prohibited from accessing resources of the other groups without permission. As a result, each group can proceed its own job without being influenced by its environment.

The resources of a given group are locked against the other groups, to maintain the security of the resources. When a group needs a resource of another group, the group sends a request to the job monitor 2.

The job monitor 2 determines whether or not the request is acceptable according to the job definition form 11. If it is acceptable, the group can temporarily use the resource.

The job definition form of each group specifies a member or members of the group who authorize another group to or not to use a resource. If the member who gives authorization is absent, the request unit 10a and receiver 10b are used to contact the member. This technique improves the security of the resources, reduces a wait time, and improves the workability of the groups.

A password may be used to improve the security of the resources and jobs. When a group completes a job or switches the present job to another, the job monitor 2 automatically switches the resources of the group to others suitable for the new job. Accordingly, the members of the group can smoothly continue their work.

When trouble occurs, an emergency group 6 is ready to access every resource of every group, to deal with the trouble. Since the emergency group 6 has high priority, it must be protected with a password, etc. Each command may have a password to strictly maintain the security of the resources of each group. Visual devices such as video cameras and sensors are employed to confirm a member who requests a resource and a member who permits the use of the resource. This technique further improves the security of the resources.

The "resources" may be windows, programs (objects), commands, and data including voice, animated images, and still images.

An embodiment of the first aspect of the present invention will be explained. FIGS. 2 and 3 show the rights to use windows exchanged among groups.

Groups A and B are in parallel with each other and are connected to a network. The groups A and B separately carry out jobs. In FIG. 2(A), the group B is allowed to access windows belonging to the group B but prohibited from accessing windows belonging to the group A. Each group carries out its own job without being influenced by its external environment. The windows of each group are locked against external accesses, and the data of each group is protected against destruction due to erroneous operations from the outside.

To effectively use the resources and improve the workability of the groups, each group must access the resources of another group.

When accessing windows wa1 and wa3 of the group A, the group B sends a request to the job monitor 2. The job monitor 2 refers to the group management table 21 prepared according to the job definition form 11, and requests the group A to change the attributes of the requested windows. If the request is accepted, the group B temporarily accesses the windows wa1 and wa3 of the group A as shown in FIG. 2(B).

Figure 3A:
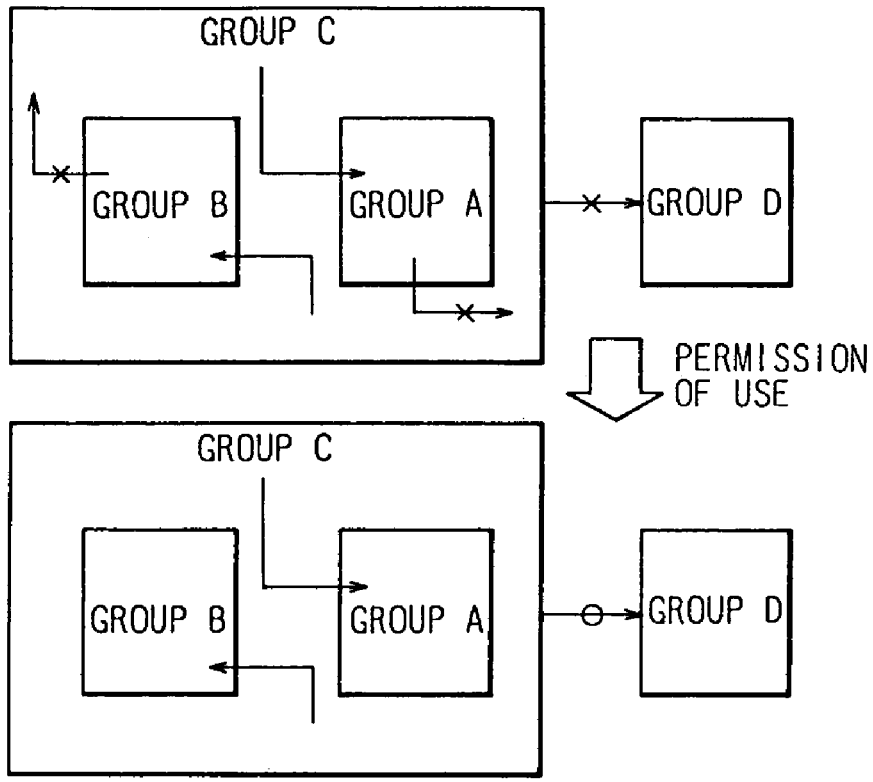
FIGS. 3A and 3B show windows whose access rights are exchanged among groups.

FIG. 3(A) shows hierarchical groups. Groups A and B are included in a group C. The group C is allowed to access windows of the groups A and B. The groups A and B are prohibited from accessing windows belonging to the group C. The group C is not allowed to access windows belonging to a group D. If the job monitor 2 permits, the group C can access the windows of the group D.

When a group completes a job or switches a job to another, the job monitor 2 automatically changes windows of the group to others suitable for the new job. Accordingly, the members of the group smoothly continue their work.

Figure 3B:
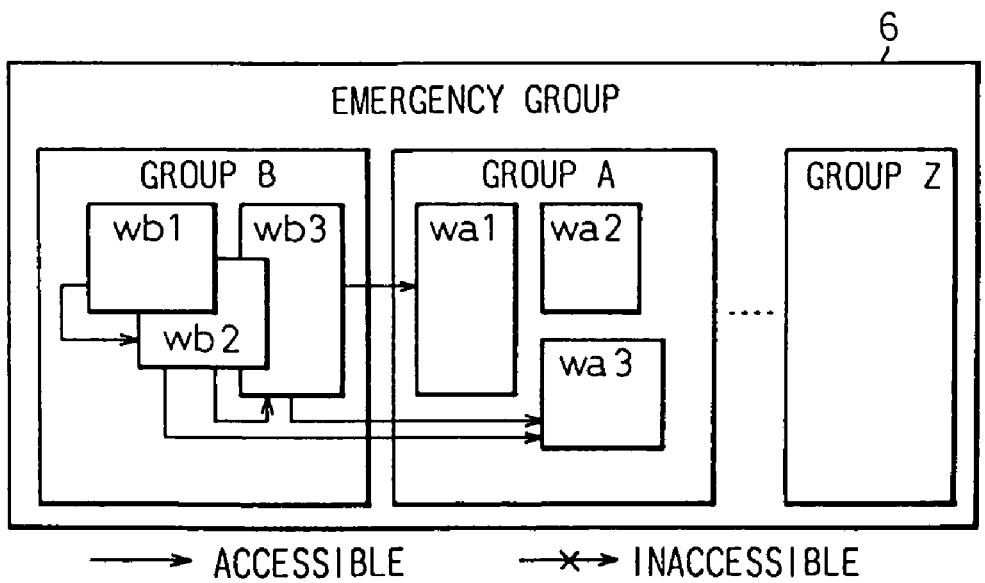

When an emergency event occurs or when the correctness of a job must be checked according to a procedure, the emergency group 6 accesses every resource of every group as shown in FIG. 3(B). The group 6 includes all groups. The group 6 is usually not used. Only when the conditions and resources of the groups must be checked, the emergency group 6 is used. The group 6 is useful to maintain the security of the resources.

The above embodiment is applicable not only to windows but also to other resources such as programs (objects) and data.

Figure 4A:
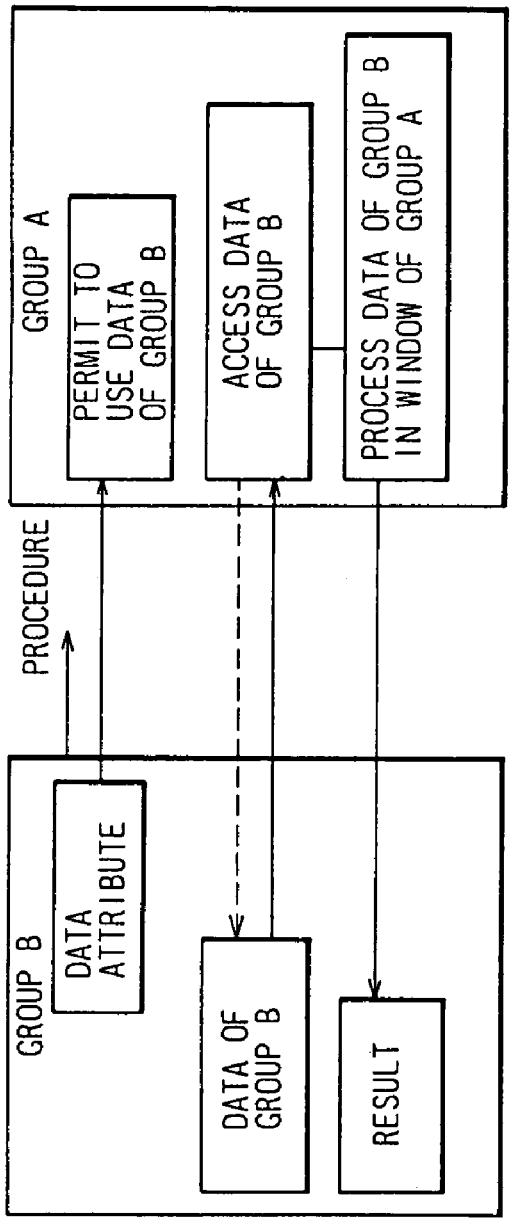
FIGS. 4A and 4B show jobs carried out between groups according to an embodiment of the present invention.

FIGS. 4 and 5 show an example in which a group A processes data belonging to a group B and the processed data is returned to the group B. In FIG. 4(A), the group B changes the right to use data from the group B to the group A through the job monitor 2. The group A processes the data and returns the processed data to the group B. Before allowing the group A to access the data of the group B, the job monitor 2 checks to see if the group A is qualified to use the data according to the group management table 21. After the job monitor 2 permits the use of the data, the group A accesses the data.

Figure 4B:
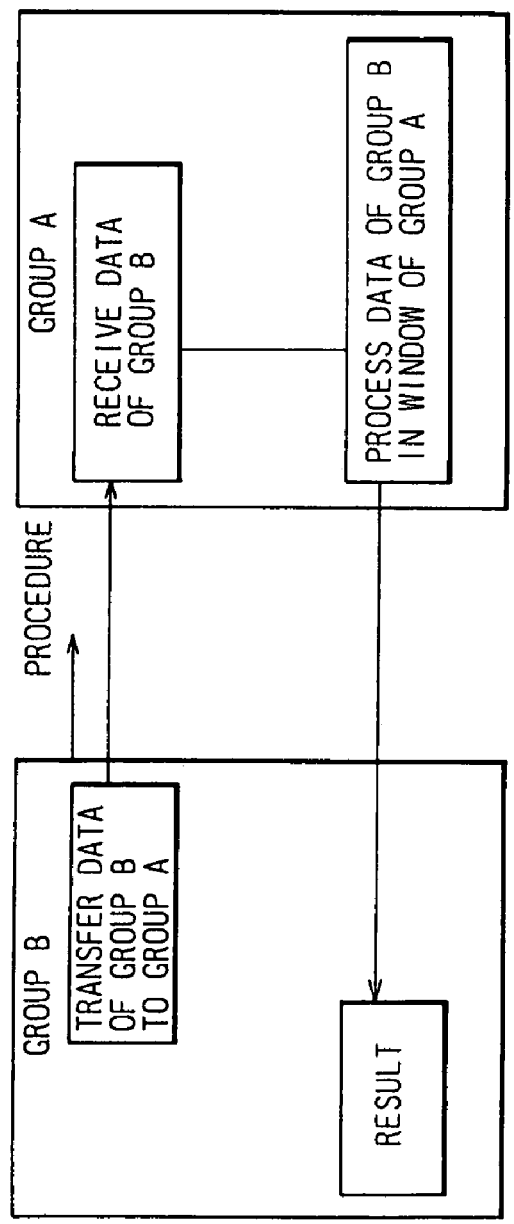

In FIG. 4(B), the data itself is transferred from the group B to the group A instead of switching the right to use the data from the group B to the group A. The group A processes the data and returns the processed data to the group B.

Figure 5A:
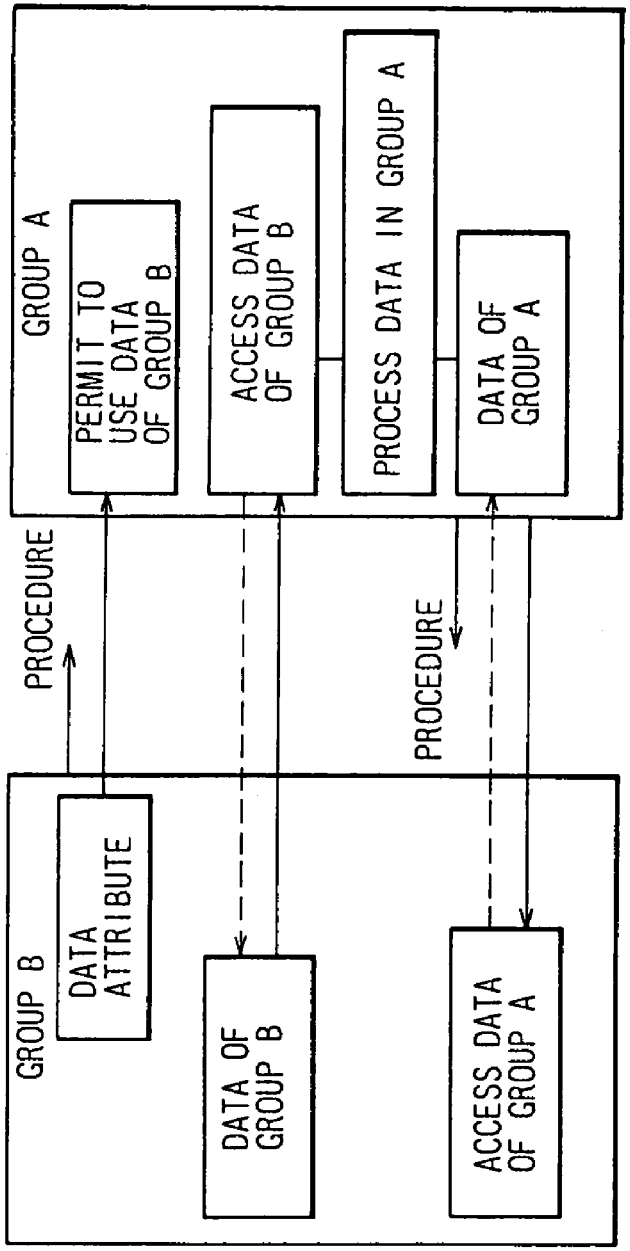
FIGS. 5A and 5B show jobs carried out between groups according to an embodiment of the present invention.

In FIG. 5(A), the attribute of data, i.e., the right to use the data is changed from the group B to the group A through the job monitor 2. The group A accesses and processes the data and holds the processed data. The group A allows the group B to access the processed data through the job monitor 2, and the group B accesses the processed data held by the group A.

Figure 5B:
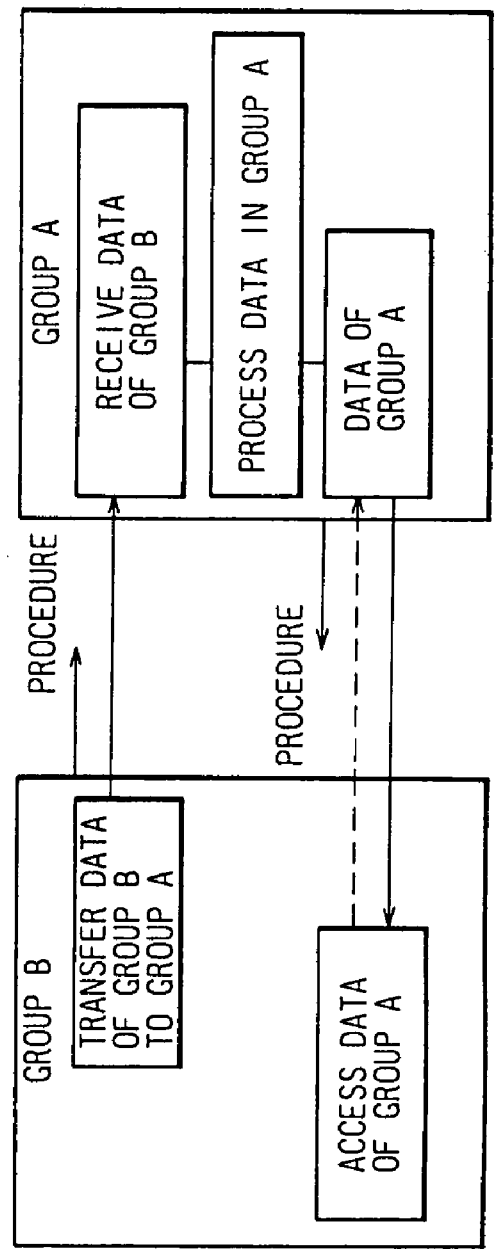

In FIG. 5(B), the group B transfers data belonging to the group B to the group A through the job monitor 2. The group A processes the data and holds the processed data. The group A allows the group B to access the processed data through the job monitor 2, and the group B accesses the processed data held by the group A.

Figure 6A:
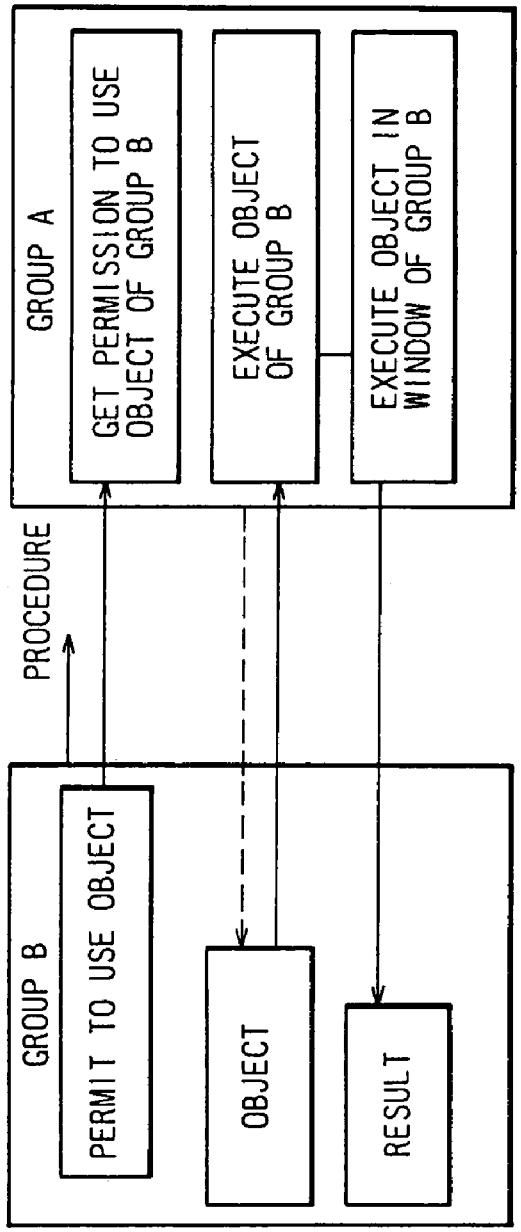
FIGS. 6A and 6B show jobs carried out between groups according to an embodiment of the present invention.

In FIGS. 6 and 7, a group B transfers an object itself or the right to use the object to a group A. In FIG. 6(A), the group B provides the group A with permission to use an object through the job monitor 2. The group A executes the object in a window of the group B and notifies the group B of a result.

Figure 6B:
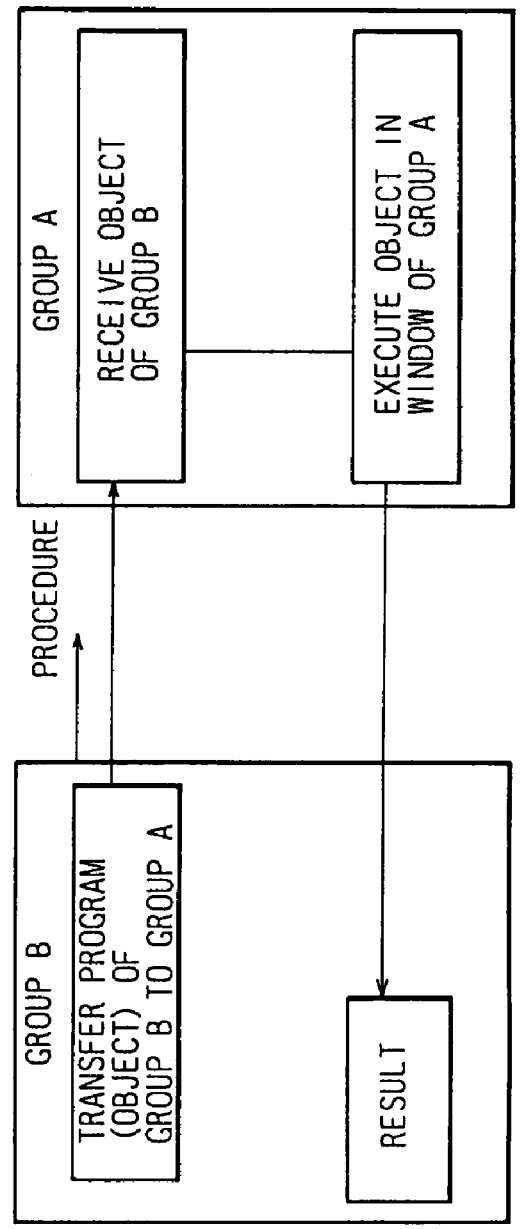

In FIG. 6(B), the group B transfers a program (an object) to the group A through the job monitor 2. The group A executes the program in a window of the group A and notifies the group B of a result.

Figure 7A:
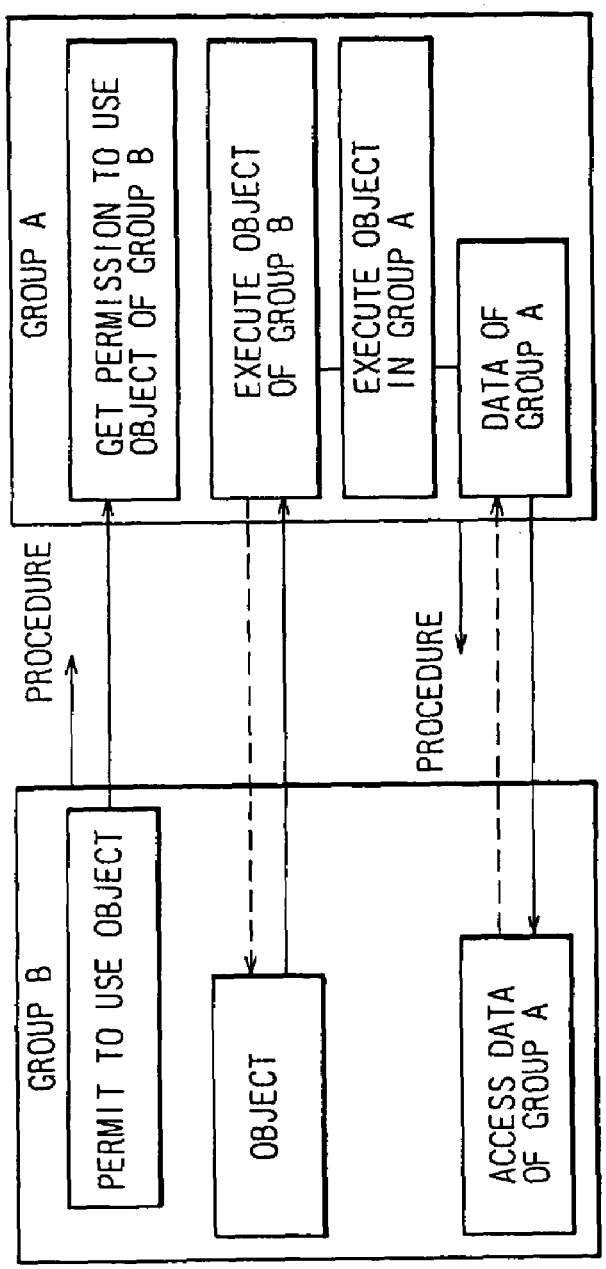
FIGS. 7A and 7B show jobs carried out between groups according to an embodiment of the present invention.

In FIG. 7(A), the group B provides the group A with permission to use an object through the job monitor 2. The group A executes the object under the environment of the group A and holds the resultant data. The group A allows the group B to access the resultant data through the job monitor 2, and the group B accesses the resultant data held by the group A.

Figure 7B:
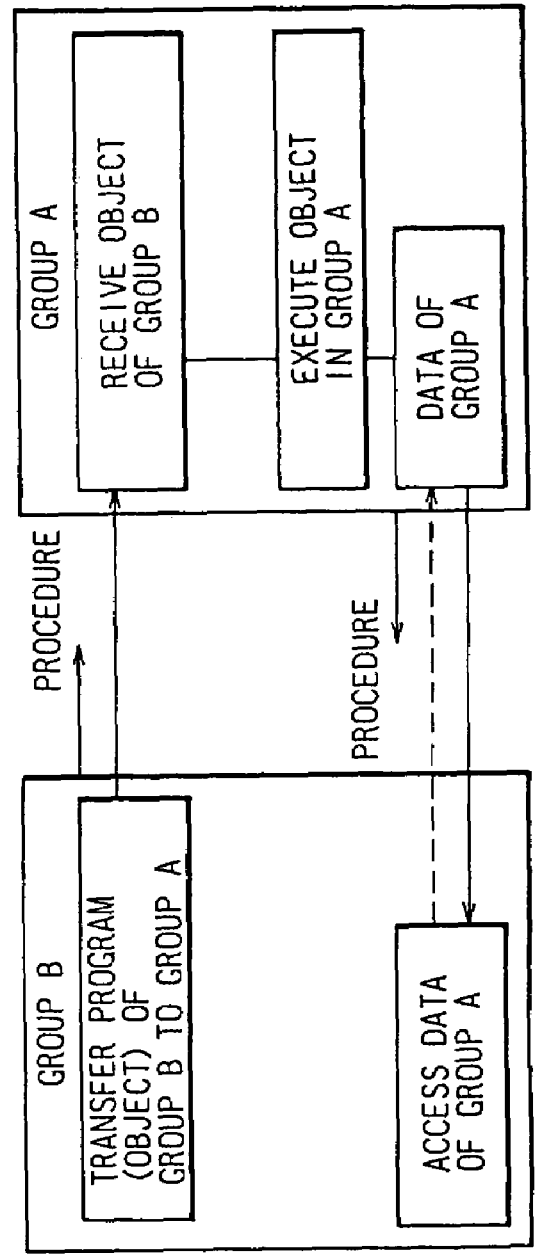

In FIG. 7(B), the group B transfers a program (an object) to the group A through the job monitor 2. The group A executes the program under the environment of the group A and stores the resultant data in the group A. The group A allows the group B to access the resultant data through the job monitor 2, and the group B accesses the resultant data stored in the group A.

The operation of each unit will be explained.

The procedure memory 1 receives a request definition form from each group. The request definition form defines the procedure of each job of the group. According to the request definition forms, the procedure memory 1 prepares a job definition form 11 that defines the jobs, work hours, required resources of each group.

FIG. 8 shows an example of the request definition form. The request definition form is prepared by each group and defines the procedure of each job of the group. The request definition form includes a start data "stdate" that defines the date of start of a series of jobs of the group, a completion date "spdata" that defines the date of completion of the jobs of the group, the name of the group, the names of the jobs A1 to An, the start data of each job, the completion data of each job, a window to be used, an object to be used in the window, and data to be used.

FIG. 9 shows an example of the job definition form 11 prepared according to the request definition forms of FIG. 8. The job definition form 11 defines the jobs of each group, the names of workers of each group, the date of start of the jobs, the date of completion of the jobs, and the procedure, resources, and end conditions of each job.

In FIG. 9, "for (time N week)" specifies a period. It is possible to specify a start date and an end date as "for (startDate to: stopDate)." If each group carries out a single job, the name of the job is omitted and only the name of the group is specified. "Status:all" indicates that a status of "all" is returned when all jobs are complete. "Status:one" is used when a job is complete. "Status:data [group name (job name)]" is used to indicate that a job is carried out after data is stored.

FIG. 10 is a flowchart showing steps taken by the job monitor 2. Step S11 receives the job definition form 11 from the procedure memory 1. Step S12 provides the scheduler 3 with the job definition form 11. Step S13 receives conditions to use resources such as windows, programs (objects), commands, and data from the scheduler 3.

Step S14 provides the resource manager 5 with the conditions to use the resources and requests the resource manager 5 to register the rights to use the resources. Step S15 provides the rearrangement unit 4 with the start date, completion date, and name of each job of each group, and the members of each group. Step S16 receives the name of the present job of each group and the present members of each group from the rearrangement unit 4. Step S17 registers the data obtained in step S16 into the group management table 21.

Step S18 monitors the jobs of the groups and transfers requests and messages among the groups according to the group management table 21. For example, the job monitor 2 transfers permission for use of data from the group B to the group A in step S18. Step S19 transfers requests and replies among the scheduler 3, rearrangement unit 4, resource manager 5, and groups.

Step S20 amends the procedures and members stated in the group management table 21 according to requests from the units 3 to 5 and groups. If step S19 causes changes in the work hours and group members, step S20 must amend the group management table 21 accordingly. Step S21 determines whether or not all jobs are complete. If they are complete, the flow returns to step S11, and if not, the flow returns to step S18.

Figure 11:
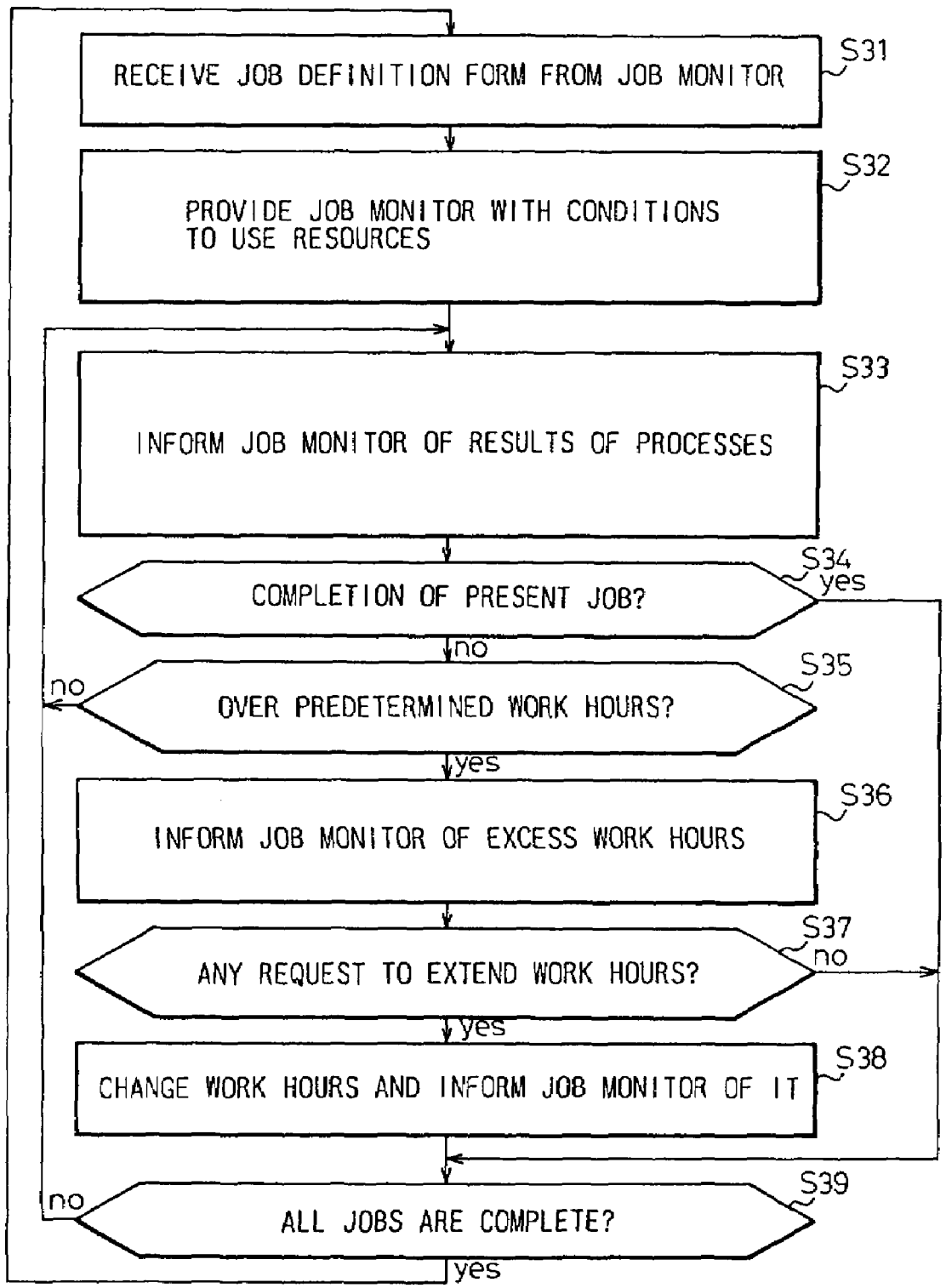
FIG. 11 is a flowchart showing steps taken by a scheduler.

FIG. 11 is a flowchart showing steps taken by the scheduler 3.

Step S31 receives the job definition form 11 from the job monitor 2 (step S12 of FIG. 10). Step S32 picks up resources from the job definition form 11 and provides the job monitor 2 with conditions to use the resources.

Step S33 receives work states from the job monitor 2, carries out processes according to the job definition form 11 and the work states, and informs the job monitor 2 of results of the processes. Step S34 determines whether or not the job monitor 2 has been informed of the completion of a present job. If the job is complete, the flow goes to step S39, and if not, step S35.

Step S35 determines whether or not the work hours of the present job are over a predetermined value. If YES, the flow goes to step S36, and if not, step S33. Step S36 notifies the job monitor 2 that the predetermined work hours have passed and waits for an instruction to stop the job or extend the work hours. Step S37 determines whether or not the group in question has requested to extend the work hours through the job monitor 2. If the request has been made, the flow goes to step S38, and if not, step S39. Step S38 changes the work hours and informs the job monitor 2 of the result.

Step S39 determines whether or not all jobs are complete. If they are complete, the flow goes to step S31, which waits for a new job definition form 11 from the job monitor 2. If the jobs are not complete, the flow goes to step S33.

Figure 12:
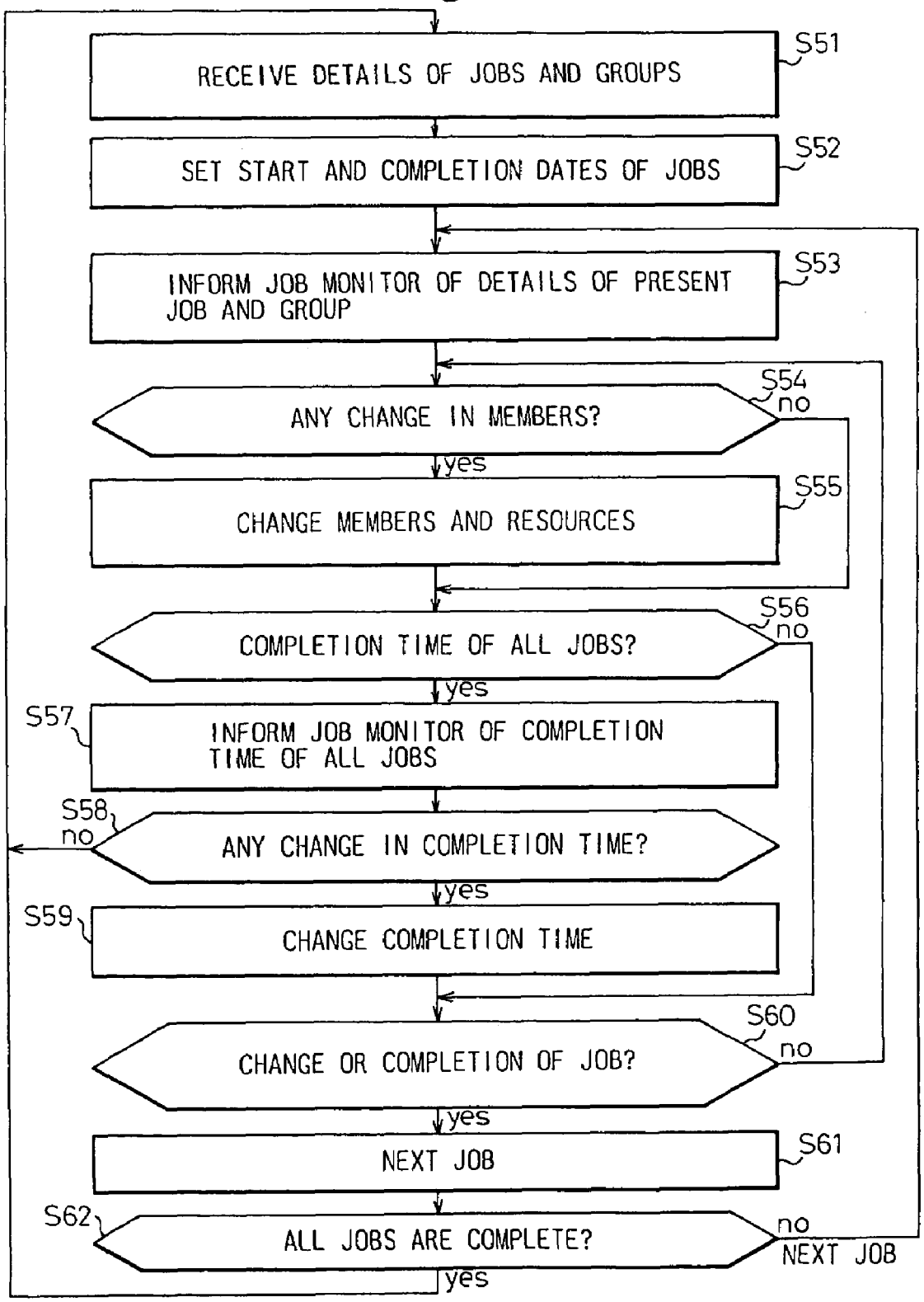
FIG. 12 is a flowchart showing steps taken by a rearrangement unit.

FIG. 12 is a flowchart showing steps taken by the rearrangement unit 4. Step S51 receives the date of start of each job, the data of completion of each job, the name of each group, the name of each job of each group, and the members of each group from the job monitor 2. Step S52 sets the date of start of jobs and the date of completion of the jobs according to the job definition form 11.

Step S53 provides the job monitor 2 with the name of a group that starts a job, the name of the job, and the members of the group. Step S54 determines whether or not the job monitor 2 has been informed of a change in the members of a group. If there is no such information, the flow goes to step S56, and if there is, to step S55 which changes the members of the group in the member table 41 and relocates the rights to use resources related to the group.

Step S56 determines whether or not it is the completion time for all jobs. If it is, the flow goes to step S57, and if not, step S60. Step S57 informs the job monitor 2 that it is the completion time for all jobs and waits for a notice from the job monitor 2. Step S58 determines whether or not the job monitor 2 has been informed of a change in the completion time of all jobs. If the completion time is unchanged, data related to the present job procedure is abandoned, the flow returns to step S51. If the completion time is changed, step S59 changes the completion time of all jobs.

Step 60 determines whether or not the job monitor 2 has been informed of switching a job to another or the completion of a job. If there is such information, the flow goes to step S61, and if not, it returns to step S54.

Step S61 starts the next job. Step S62 determines whether or not all jobs are complete. If they are, the flow returns to step S51, which waits for information from the job monitor 2. If all jobs are not complete, the flow returns to step S53.

FIG. 13 shows an example of the group management table 21 controlled by the job monitor 2. The table 21 has the name of each resource (window, object, or data file), the number of groups that use the resource, the name of each group or the name of a job that uses the resource, and a flag that indicates one of the following states:

0: unused
1: in use
3: in use and updated in the case of data file
4: available for another group
5: belonging to another group but available FIG. 14 shows an example of the member table 41 used to manage the members of groups by the rearrangement unit 4. The table 41 contains the number of members allocated to a job of each group and the names of the members.

FIG. 15 shows an example of the resource management table 51 controlled by the resource manager 5. In FIG. 15(A), the table 51 has the name of each group or the name of each job, the name of a window for the job, the name of an object for the job, the name of data for the job, and the work conditions of the job. The table 51 contains window information about the size, menu, and activation file of each window. The table 51 also contains object information about the activation type and activation file of each object. The table 51 also contains data attribute information about the type and file of data.

Figure 16:
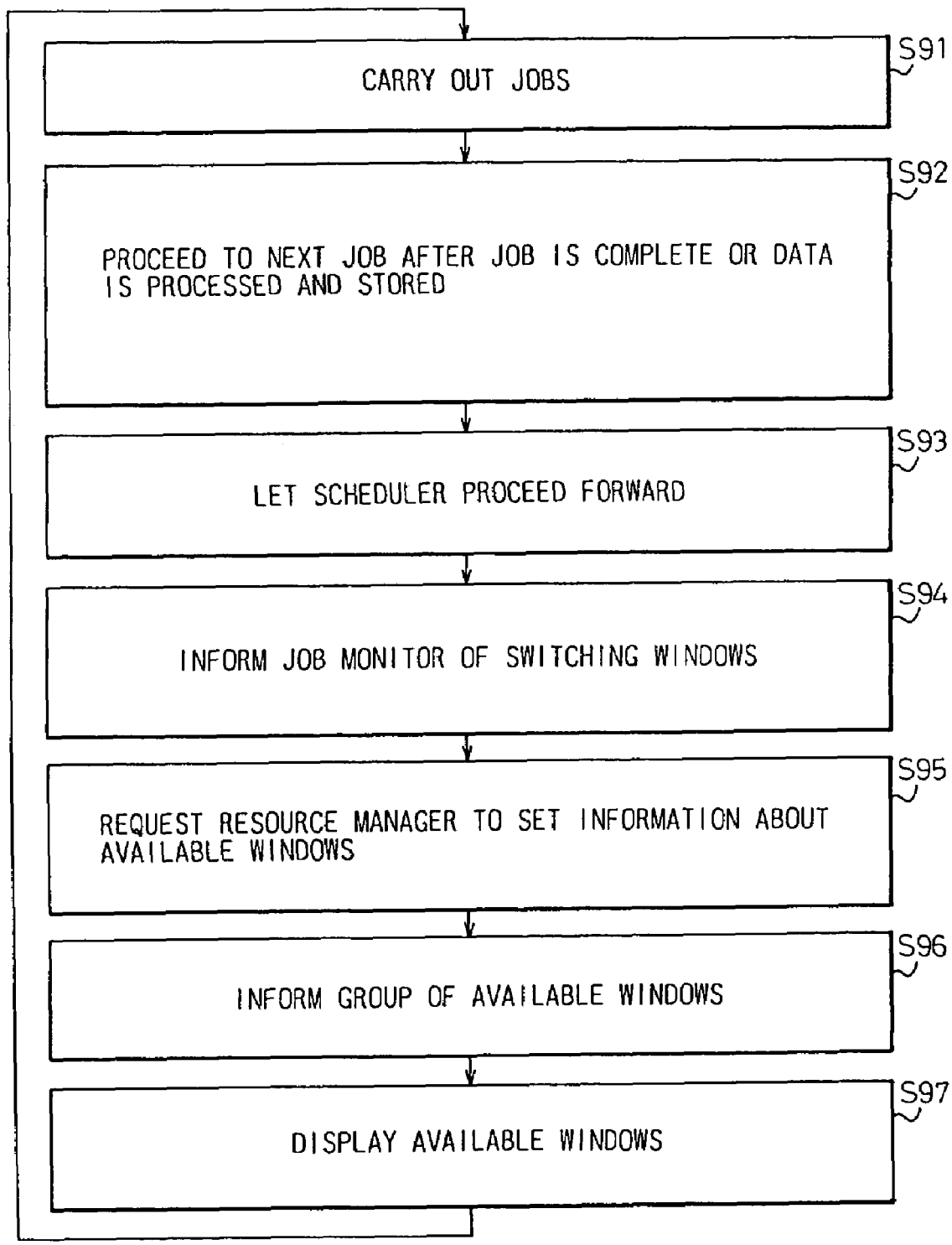
FIG. 16 is a flowchart showing the steps of changing windows from one to another.

FIG. 15(B) shows the conditions stored in the table 51. The conditions include the conditions of each window, each object, and data storage. FIG. 15(C) shows a flag indicating the conditions of a window or an object as follows:
  0: unused
  1: in use
  2: exclusive use
  3: in use, partly available for another group FIG. 15(D) shows a flag indicating a data storage state as follows:
  0: not stored
  1: completely processed
  2: interim data stored
  4: requested data
  5: stored requested data
  6: processing requested data FIG. 16 is a flowchart showing the steps of switching a window to another. In step S91, each group is carrying out a job. In step S92, a group informs the job monitor 2 that a job in a window is complete, or data is processed and stored in a resource file. The job monitor 2 refers to the job definition form 11 of the procedure memory 1 and requests the scheduler 3 for starting the next job for the group.

In step S93, the scheduler 3 proceeds according to the job definition form 11. In step S94, the scheduler 3 informs the job monitor 2 of switching a window to another. In step S95, the job monitor 2 requests the resource manager 5 to set information about available windows. In step S96, the job monitor 2 informs the group in question of the available windows. In step S97, the group displays the available windows.

Figure 17:
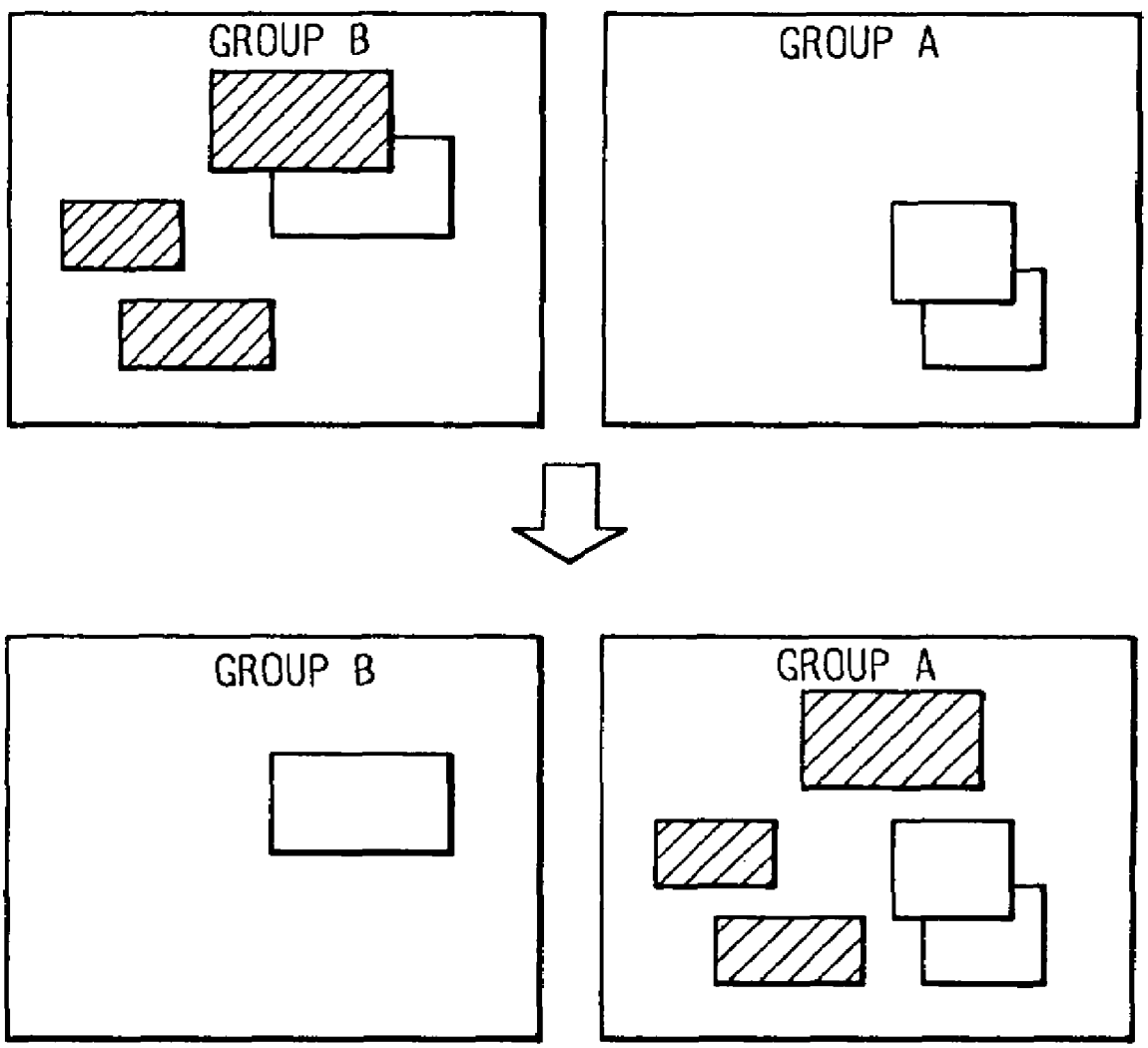
FIG. 17 explains shifting windows between groups.
Figure 18:
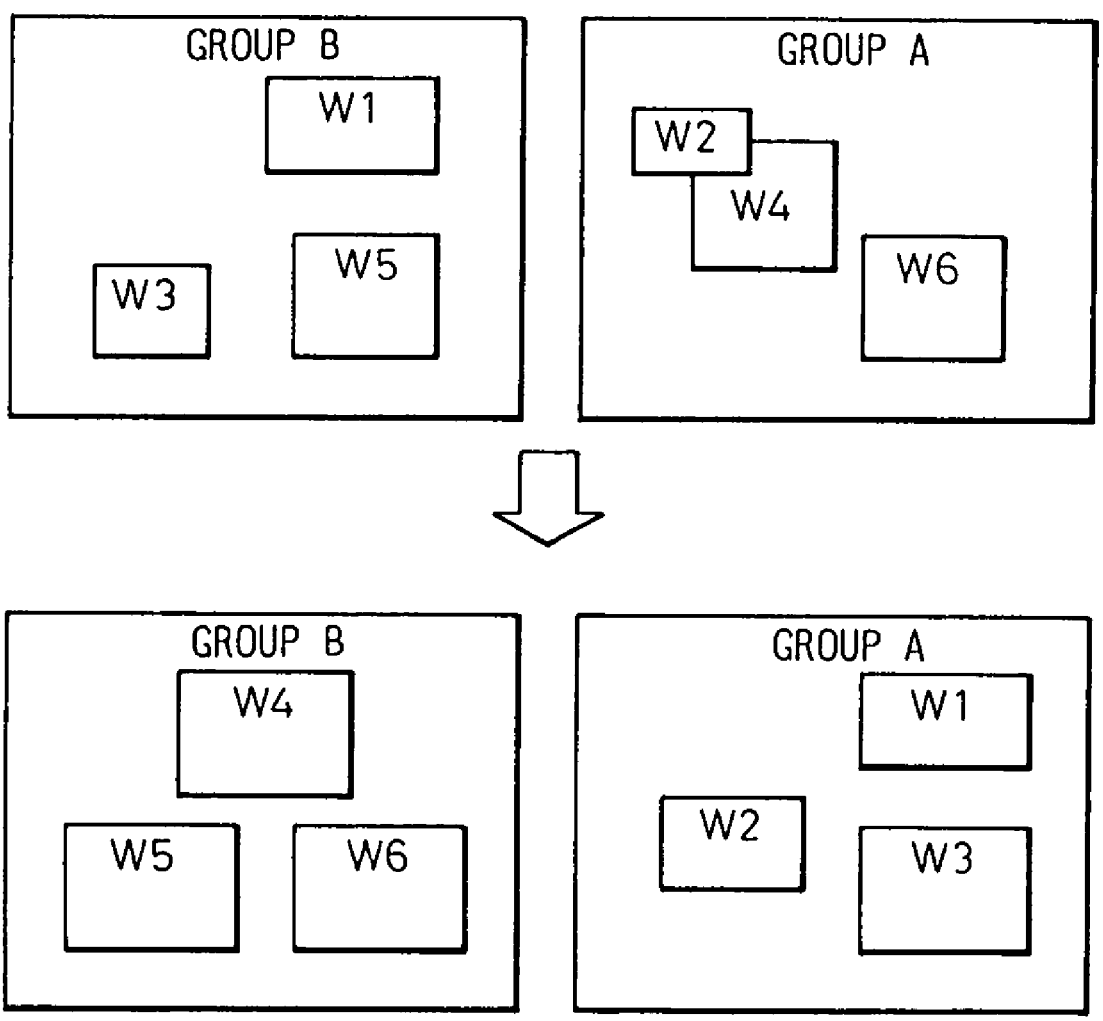
FIG. 18 explains shifting windows between groups.

FIGS. 17 and 18 show windows used between groups A and B. In FIG. 17, windows belonging to the group B are transferred to the group A according to a request from the group A or B. In FIG. 18, windows are relocated when a job is complete or when a job is changed to another.

FIG. 19 shows windows locked. When a group completes a job or changes a job to another, the job monitor 2 checks the rights to use windows. In FIG. 19(A), the group A is allowed to access windows that are allocated for the next job, and is prohibited from accessing the other windows that are locked.

In FIG. 19(B), a window W32 of the group A is given to the group B to carry out the next job. At the same time, a window W34 of the group B is given to the group A. Consequently, the group A uses the windows W31 and W34, and the group B uses the windows W32 and W33.

When a group changes a job to another, windows related to the preceding job disappear from a screen of the group. Any group is allowed to temporarily use a window of another group upon receiving permission to use the same. In FIG. 19(C), the group B uses a window W42 belonging to the group A, to see data of the group A. The group B may continuously use the data of the group A, if the next job of the group B requires the same.

Figure 20:
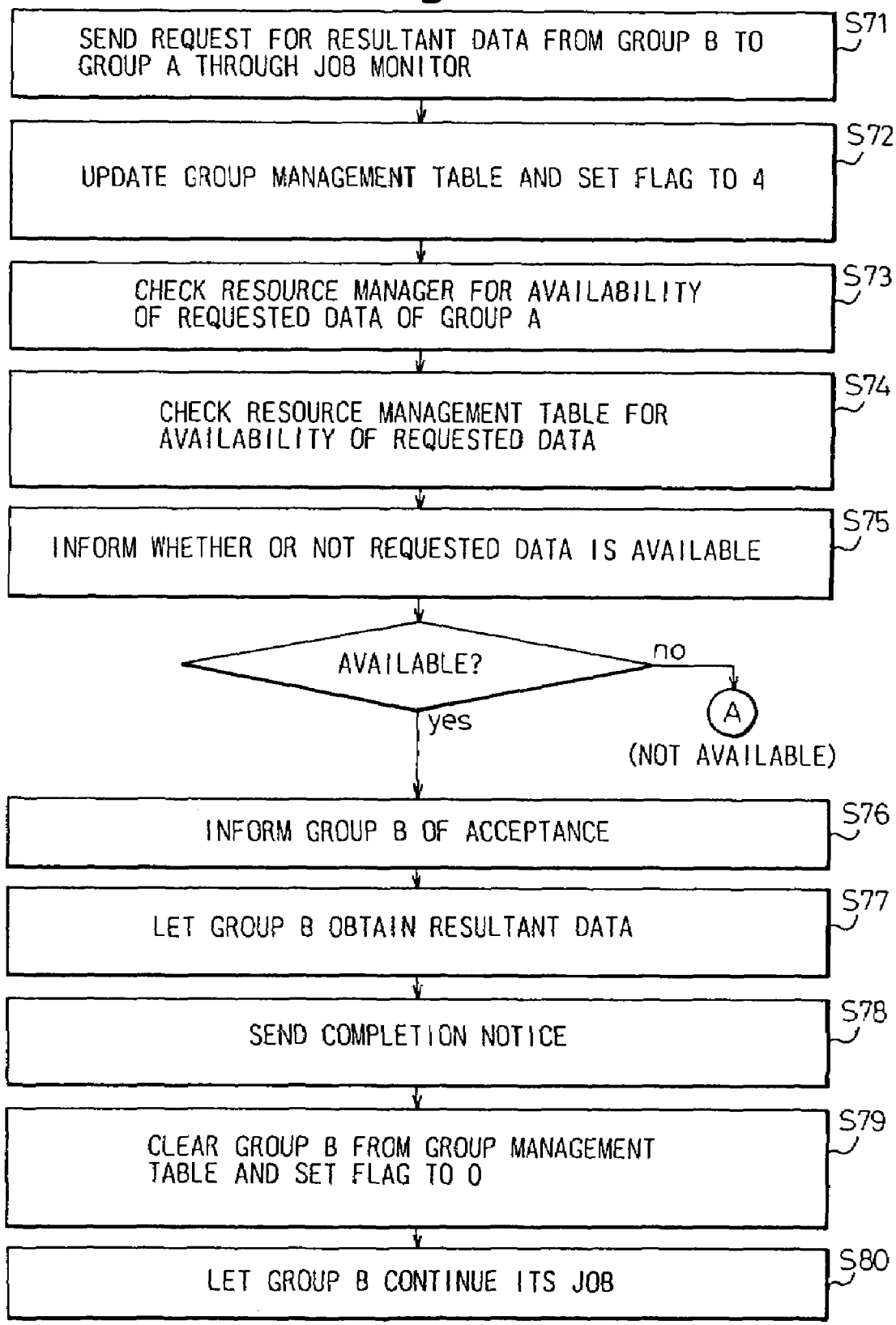
FIG. 20 is a flowchart showing the steps of sharing a resource between groups.
Figure 21:
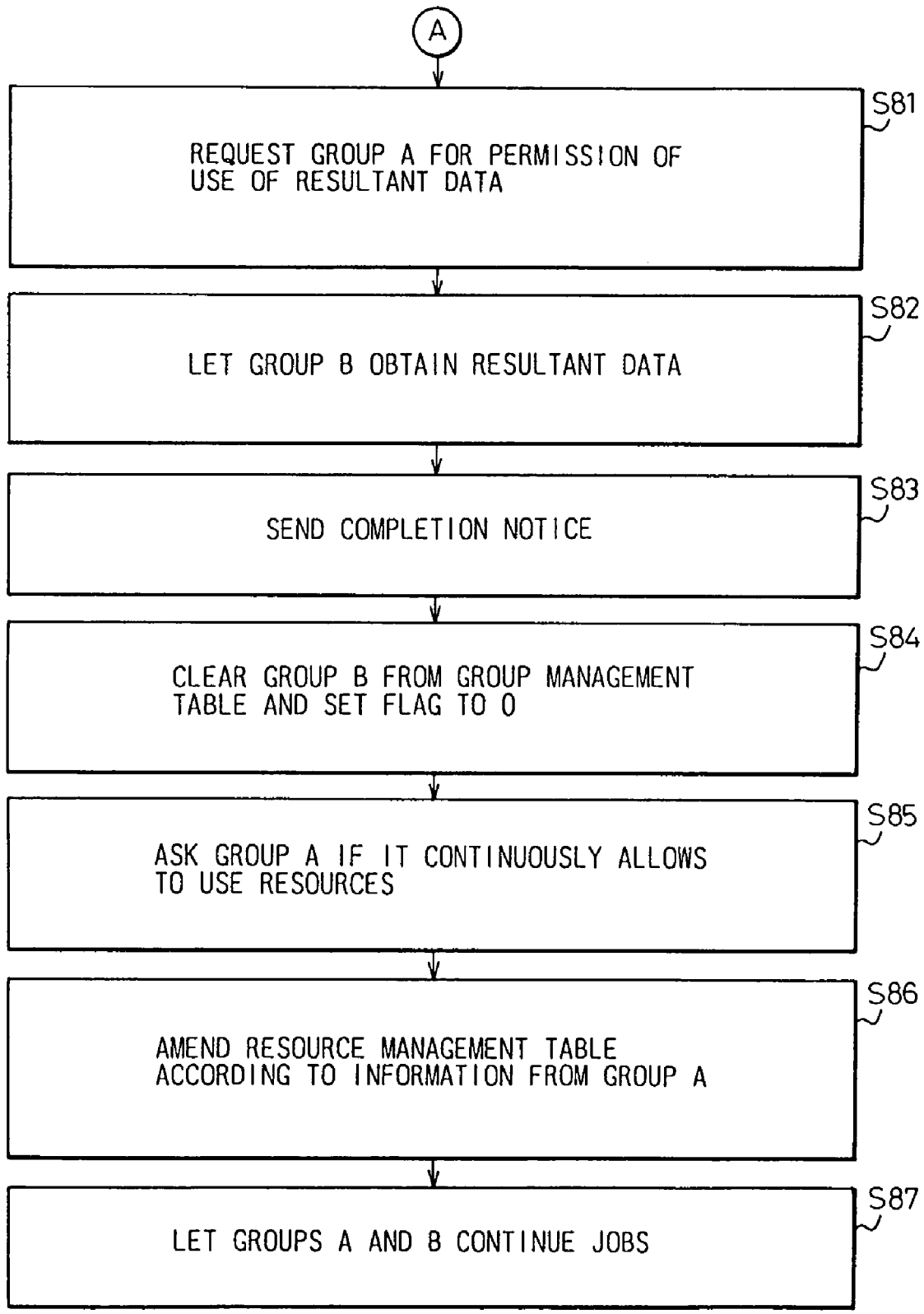
FIG. 21 is a continuation of the flowchart of FIG. 20.

FIGS. 20 and 21 are flowcharts showing the steps of the group B requesting the group A to carry out a job and provide the group B with a result of the job. Namely, the group B provides the group A with data, the group A processes the data in its own environment. Thereafter, the group B receives resultant data from the group A as mentioned below.

In step S71, the job monitor 2 receives from the group B a request to the group A to provide the resultant data. In step S72, the job monitor 2 sets the name of the group B in a corresponding window of the group management table 21 and sets the flag of FIG. 13 to "4" to indicate that the request has been made to another group. In step S73, the job monitor 2 checks the resource manager 5 to see if the requested data of the group A is available for another group. In step S74, the resource manager 5 checks the availability of the data in the resource management table 51. In step S75, the resource manager 5 informs the job monitor 2 whether or not the data is available.

If the data is available, the flow goes to step S76, and if not, step S81 of FIG. 21.

In step S76, the job monitor 2 informs the group B of acceptance. In step S77, the group B temporarily uses the window of the group A and obtains resultant data. In step S78, the group B provides the job monitor 2 with a completion notice. In step S79, the job monitor 2 clears the name of the group B from the group management table 21 and sets the flag to 0.

In step S80, the group B continues its job. If the group B is not allowed to use the resources of the group A, the job monitor 2 requests, in step S81 of FIG. 21, the group A to allow the use of the resources. If the group A provides permission to use the resources, the job monitor 2 informs the resource manager 5 of the same, so that the group B may use the resources.

In step S82, the group B temporarily uses the window of the group A and obtains the resultant data. In step S83, the job monitor 2 receives a completion notice from the group B. In step S84, the job monitor 2 clears the name of the group B from the group management table 21 and sets the flag to 0.

In step S85, the job monitor 2 asks the group A whether or not it continuously allows the use of the resources. In step S86, the job monitor 2 receives a resource using state from the group A and informs the resource manager 5 of the same, to change the flag, etc., in the resource management table 51. In step S87, the groups A and B continue their jobs.

FIG. 22 shows a system according to an embodiment of the present invention. The system includes a server 100, terminals such as personal computers 101 to 104, and a resource storage unit 110 for storing resources. These components are connected to one another through a network 120. The procedure memory 1, job monitor 2, scheduler 3, rearrangement unit 4, resource manager 5 are realized by, for example, the server 100. A user of a group enters its ID to one of the server 100 and terminals 101 to 104 and carries out a job by using windows allocated to the group.

The server 100 manages resources group by group. Each group is allowed to use resources such as windows, objects, and data allocated to the group. The rights to use resources may be exchanged among the groups. The resources are automatically exchanged among the groups according to the progress of jobs of the groups. The groups work independently while cooperating with one another.

FIGS. 23 and 24 show the systems of the present invention explained above.

FIGS. 25 and 26 show an example of the resource management table 51 of the resource manager 5. In FIG. 25(A), the table 51 contains the name of each group, the number of the members of each group, the name of each member, the name of each window, the name of each command or object, the name of data, the name of monitor television and voice, the name of a contact, and work conditions. FIG. 25(B) shows the work conditions including the conditions of windows, objects, and commands, data storage conditions, contact conditions, monitor camera operating conditions, monitor camera input conditions, and voice input/output conditions. According to these conditions, the job monitor 2 manages resources among the groups.

FIG. 25(C) shows a flag indicating the state of a window, object, or command.
 0: unused
 1: in use
 2: exclusive use
 3: exclusive use by specific members
 4: exclusive use by specific member
 5: in use, available for another group
 6: being checked
 7: being checked with all members
 8: used under permission of all members
 9: being checked with specific members
 10: being checked with specific member
FIG. 25(D) explains a flag indicating the storage state of data.
 0: not stored
 1: completely processed
 2: interim data stored
 3: storage prohibited, read only
 4: storage prohibited, readable if agreed by all members
 5: storage prohibited, readable if agreed by specific member
 6: requested data
 7: requested data stored.
 8: processing requested data
FIG. 26(A) shows a contact state flag.
 0: unused
 1: contacting
 2: contacting with all members
 3: notified
 4: notified to all members
 1X: portable telephone
 2X: pager
 3X: personal computer communication
 4X: other communications
FIG. 26(B) shows a flag indicating the operating conditions of a monitor camera.
 0: unused
 1: start moving camera
 2: moving camera
 3: positioned
 1X: moving right
 2X: moving left
 3X: moving up
 4X: moving down
FIG. 26(C) shows a flag indicating the input state of the monitor camera.
 0: unused
 1: position error
 2: no input
 3: inputting
FIG. 26(D) shows a flag indicating a voice I/O state.
 0: unused
 1: request for voice message
 2: request for registration of voice message
 3: specifying voice message destination
 4: checking voiceprint
FIG. 27 shows an example of the window memory. Window information includes the name of an operating system, the name of a CPU, the environment such as the size and menu of the window. The window memory stores a window activation file (OS, CPU). FIG. 28 shows an example of the program/command memory. Object/command information includes the name of an OS, the name of a CPU, and an object activation format. The memory stores an object activation file (OS, CPU). FIG. 29 shows an example of the monitoring equipment memory. Information about a monitor and voice includes the name of each member, a location, a position (direction and angles), and a type such as voice. The memory stores operating files for the monitor and voice. FIG. 30 shows an example of the contact memory for storing contact addresses such as the number of a mobile telephone. Contact information includes the name, location, telephone number, and message code of each member. The memory also stores contact operating files. FIG. 31 shows an example of the data memory. Data attribute information includes a data type such as read-only, format, dynamic image, and voice. The memory stores data files.

Figure 33:
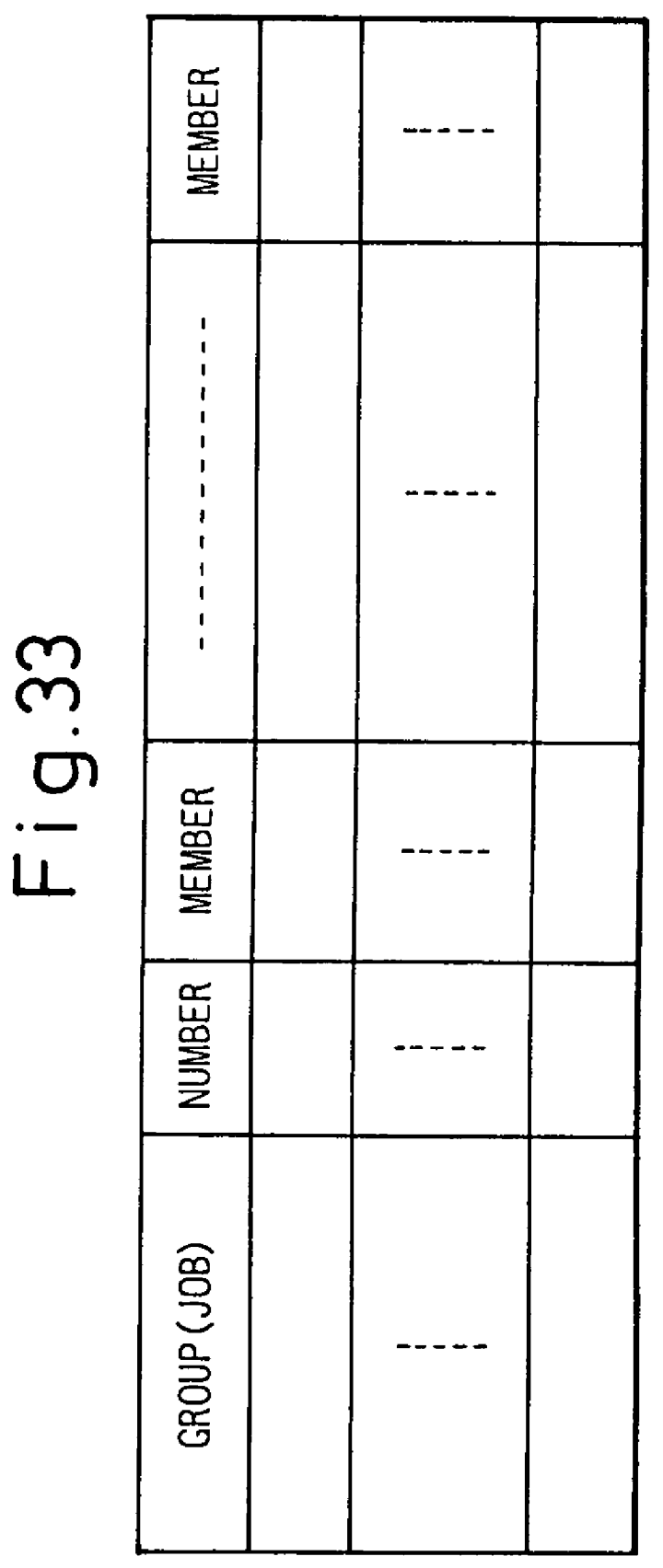

FIG. 32 shows an example of the group management table. FIG. 32(A) is the same as FIG. 13(A). FIG. 32(B) has a flag as follows:
 0: unused
 1: in use
 3: updated data/object/command/window in use
 5: creating new file from present data/object/command/window
 7: difference added to present data/object/command/window
 8: asking permission of another group
 9: permitted window/data/object/command of another group
 18: asking permission of specific member of another group
 28: asking permission of all members of another group
 38: asking permission of specific members of another group FIG. 33 shows an example of the member table. The number of members of each group or each job and the names of the members are stored in the table. FIG. 34 shows an example of the member-based emergency table. In FIG. 34(A), the table stores the name of each member, the name of a group (the name of a job) of the member, the number of temporary used resources, a tag, the name of each window, a period, etc. FIG. 34(B) shows an example of the tag as follows:
 1: name of window
 2: name of object or command
 3: name of data
FIG. 34(C) shows an example of the period, which is an available period.

FIG. 35 shows an example of the group-based emergency table. In FIG. 35(A), the table contains the name of each group (the name of each job), the number of temporary used resources, a tag, the name of a window, and a period. FIG. 35(B) shows an example of the tag. FIG. 35(C) shows an example of the period.

FIG. 36 shows a second example of the job definition form. In addition to the first example of FIG. 9, FIG. 36 has contact information, contact possibility, the number of members to be called, members to be called, monitor, etc.

FIG. 37 shows an example of the overall definition form. This form defines every group as a member and the procedures of the groups.

Figure 39:
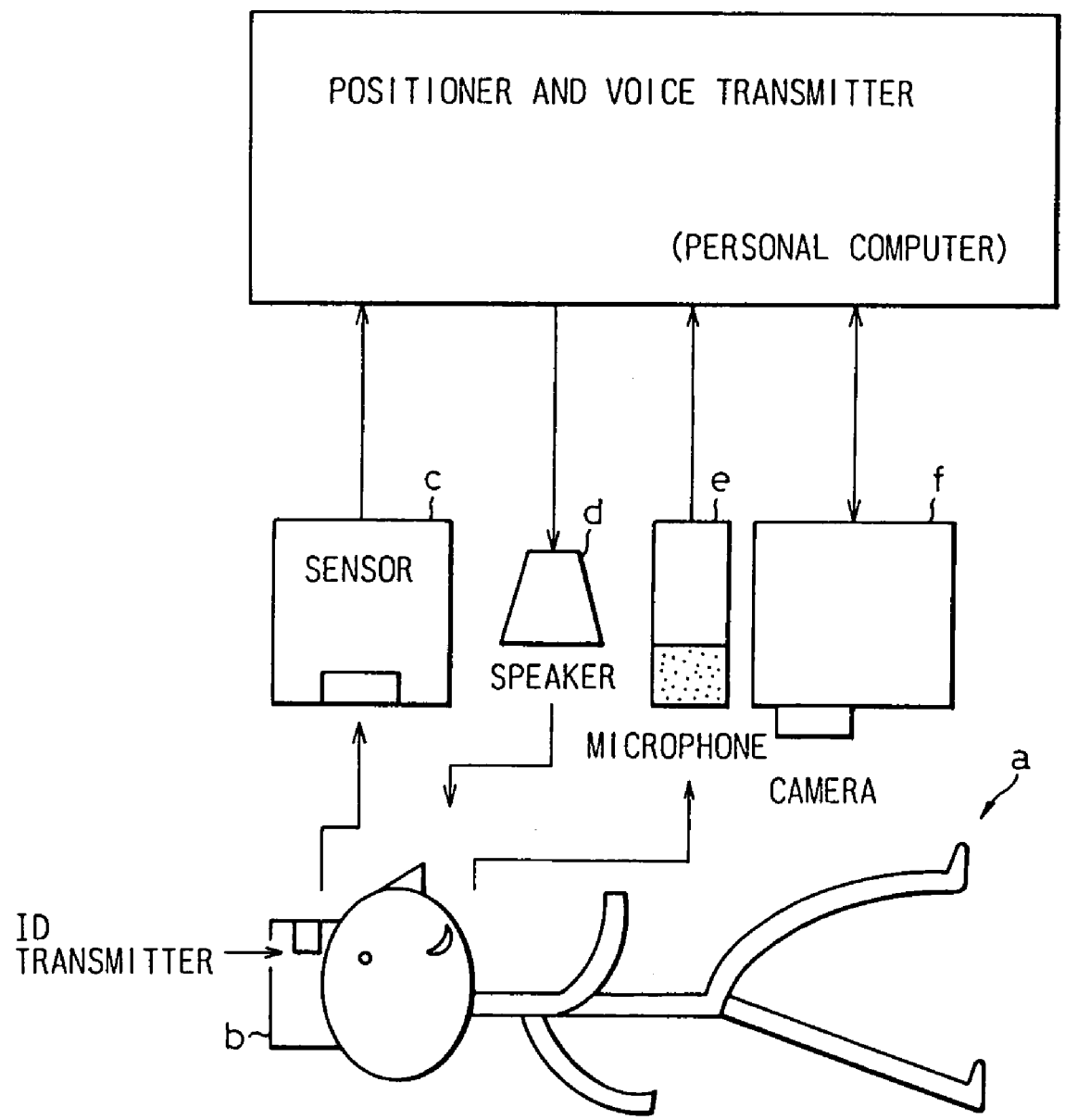
FIG. 39 shows a unit for positioning a camera.

FIG. 38 explains a window, object, or command handled by a representative name by the resource manager. Each tag is related to a representative name of, for example, a window. FIG. 39 shows an arrangement for determining the position of a camera. A personal computer may have a device for analyzing and positioning the camera and a voice transmitter. A worker "a" has a transmitter "b" on his or her head, to identify the position thereof. An ID code transmitted from the transmitter b is received by a sensor "c" that transfers the ID code to the personal computer. The personal computer also receives voice from a microphone "e" and the position of the camera. The personal computer analyzes the position of the camera and sends an instruction to the worker through a speaker "d."

Figure 40:
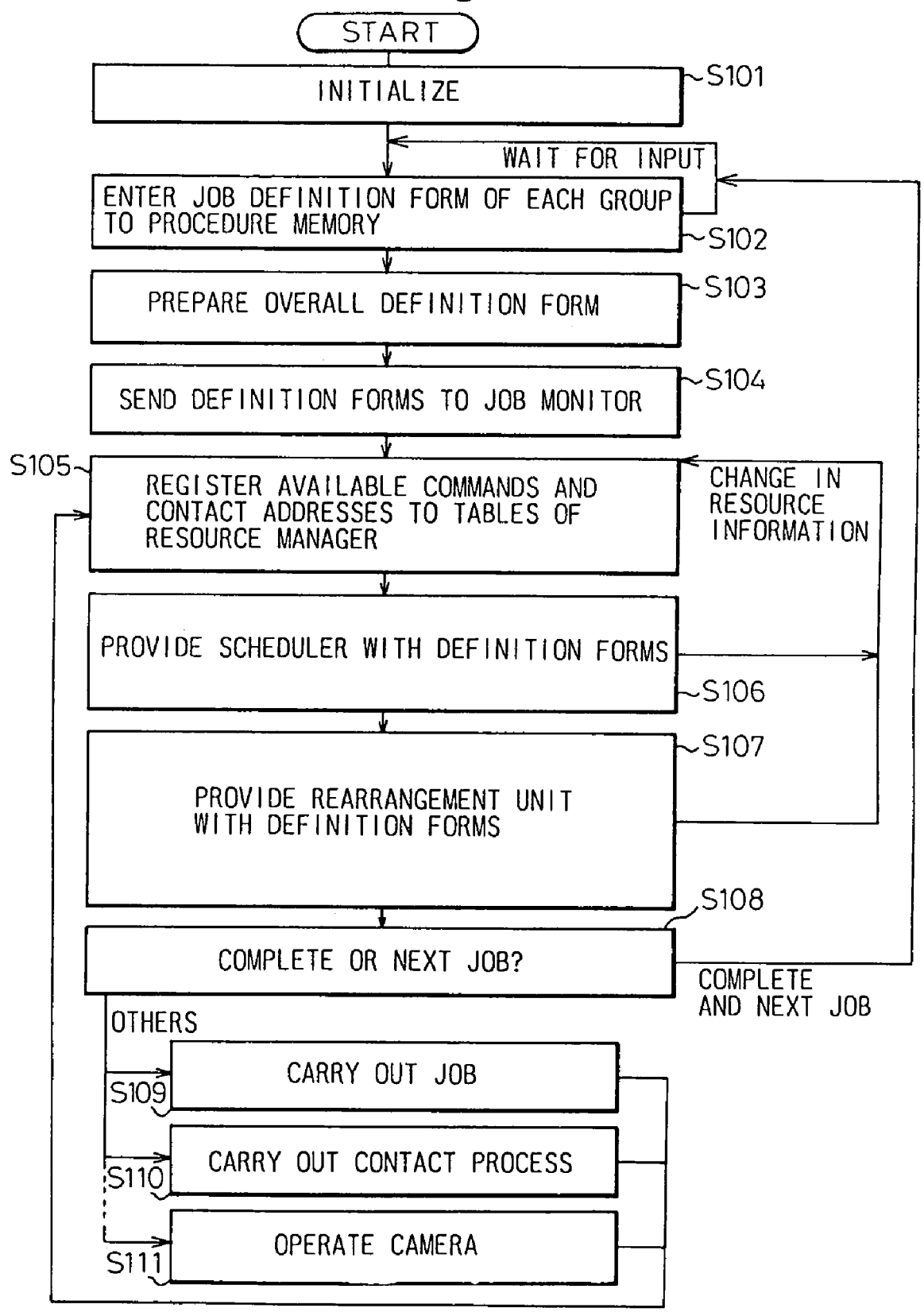
FIG. 40 is a flowchart showing the steps of sharing resources among groups according to job definition forms.

FIG. 40 is a flowchart showing the steps of sharing resources according to a job definition form. Step S101 initializes the system. Step S102 enters a job definition form of each group to the procedure memory 1. Step S103 prepares an overall definition form according to the job definition forms of the groups. Step S104 sends the definition forms to the job monitor 2. In step S105, the job monitor 2 registers available commands and contact addresses to the tables of the resource manager 5. In step S106, the job monitor 2 provides the scheduler 3 with the definition forms.

In step S107, the job monitor 2 provides the rearrangement unit 4 with the definition forms, to register the members of each group to the member table 41. The job monitor 2 sends a group changing notice to the rearrangement unit 4, if any. The rearrangement unit 4 rearranges members and informs the job monitor 2 of the result. Step S108 determines whether or not a job is complete, or the next job is started. If the job is complete, the flow returns to step-S102. In the other cases, each group carries out its own job in step S109. Step S110 carries out a contact process. Step S111 receives data and positions a camera.

Figure 41:
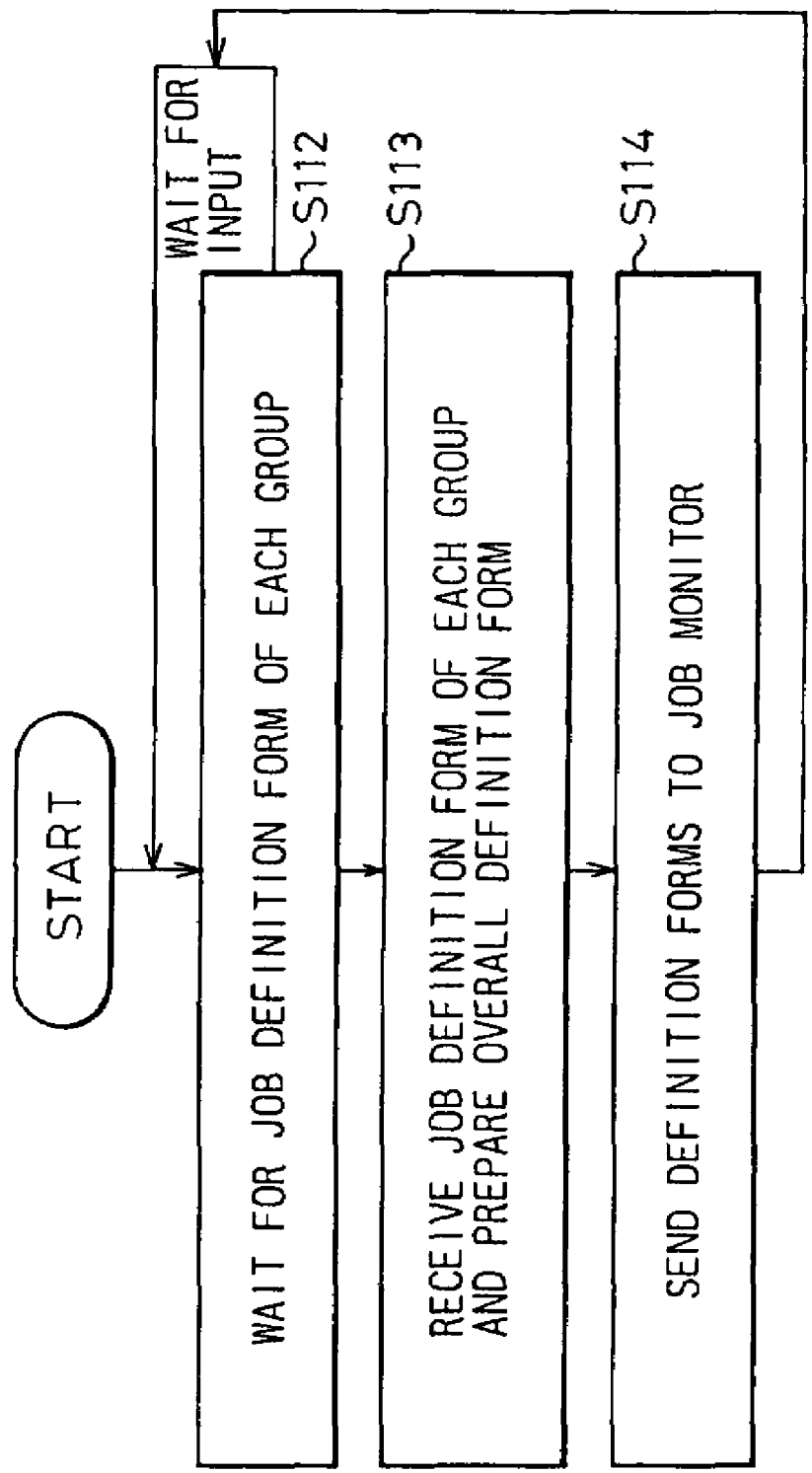
FIG. 41 is a flowchart showing steps taken by a procedure memory.

FIG. 41 is a flowchart showing the operation of the procedure memory 1. Step S112 waits for a job definition form from each group. Step S113 receives the job definition forms and prepares an overall definition form according to them. Step S114 provides the job monitor 2 with the definition forms.

Figure 42:
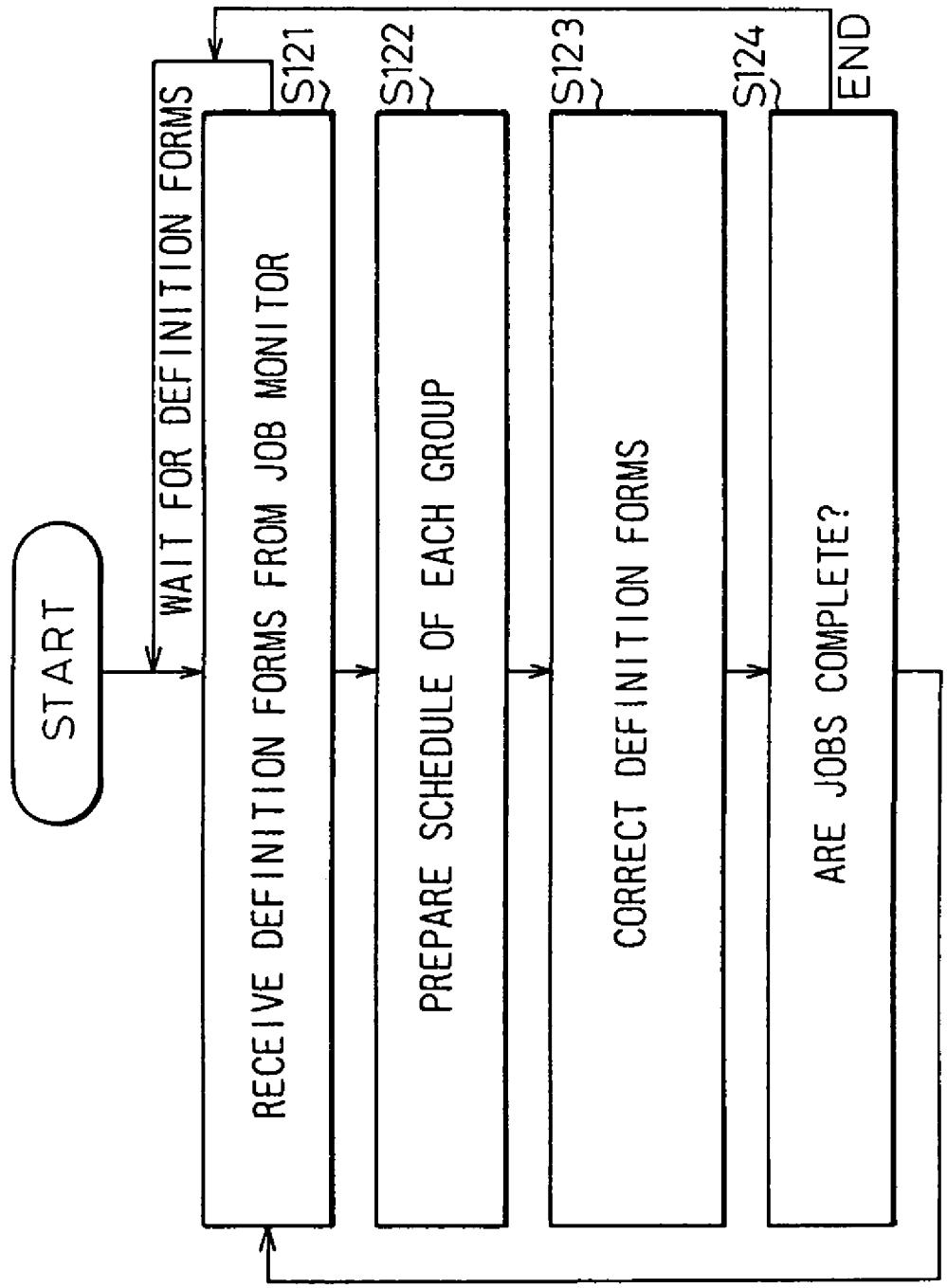
FIG. 42 is a flowchart showing steps taken by a scheduler.

FIG. 42 is a flowchart showing steps taken by the scheduler 3. Step S121 receives the job definition form from the job monitor 2. Step S122 prepares the schedule of each group through communications with the job monitor 2. Step S123 corrects the schedules if a delay occurs in the schedules and provides the job monitor 2 with amended definition forms. Step S124 determines whether or not the jobs of the job definition forms are complete.

Figure 43:
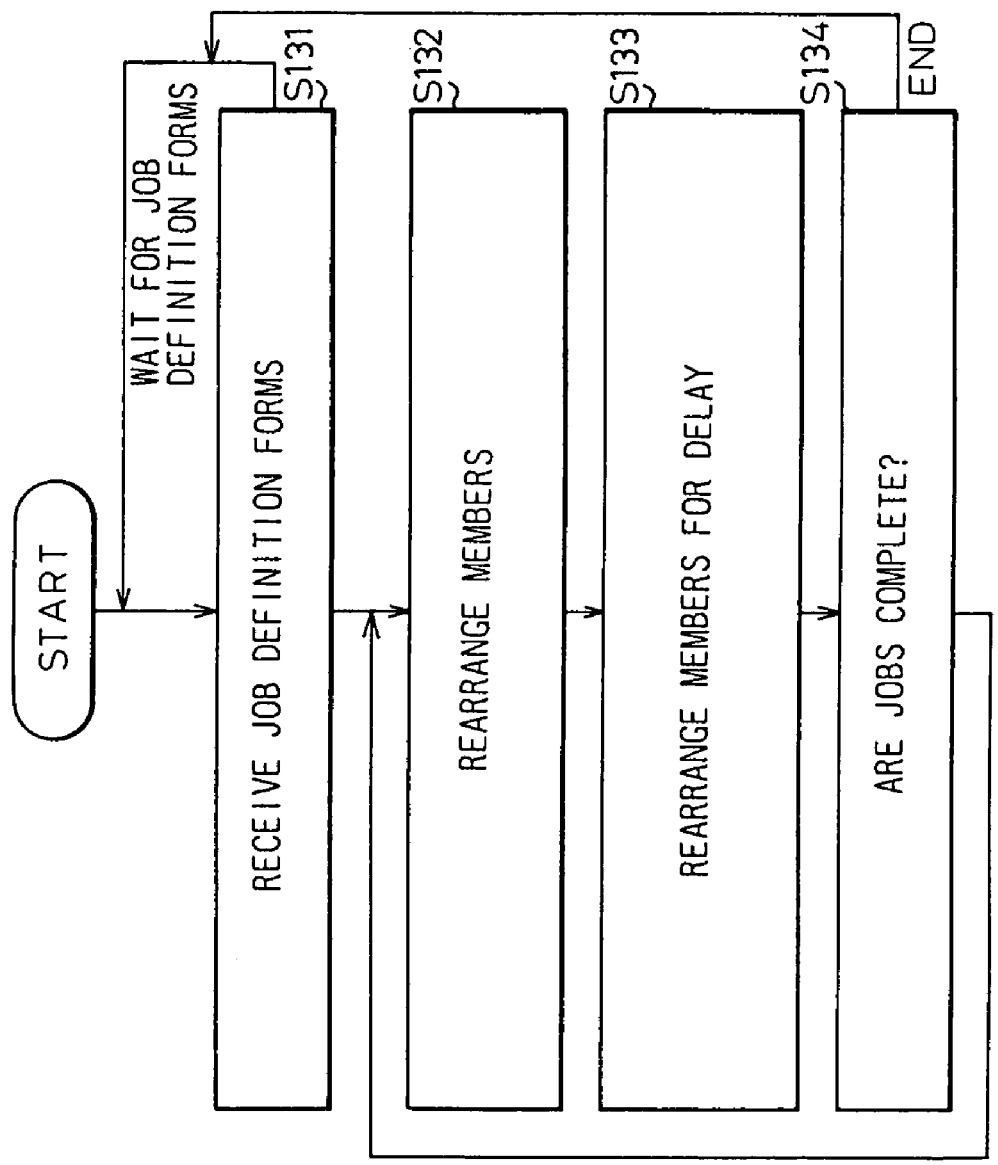
FIG. 43 is a flowchart showing steps taken by a rearrangement unit.

FIG. 43 is a flowchart showing steps taken by the rearrangement unit 4. Step S131 receives the job definition forms from the job monitor 2. Step S132 rearranges the members of the groups through communications with the job monitor 2. If a delay occurs in a job, step S133 receives an amended job definition form from the job monitor 2 and rearranges the members. Step S134 determines whether or not the jobs on the job definition forms are complete.

Figure 44:
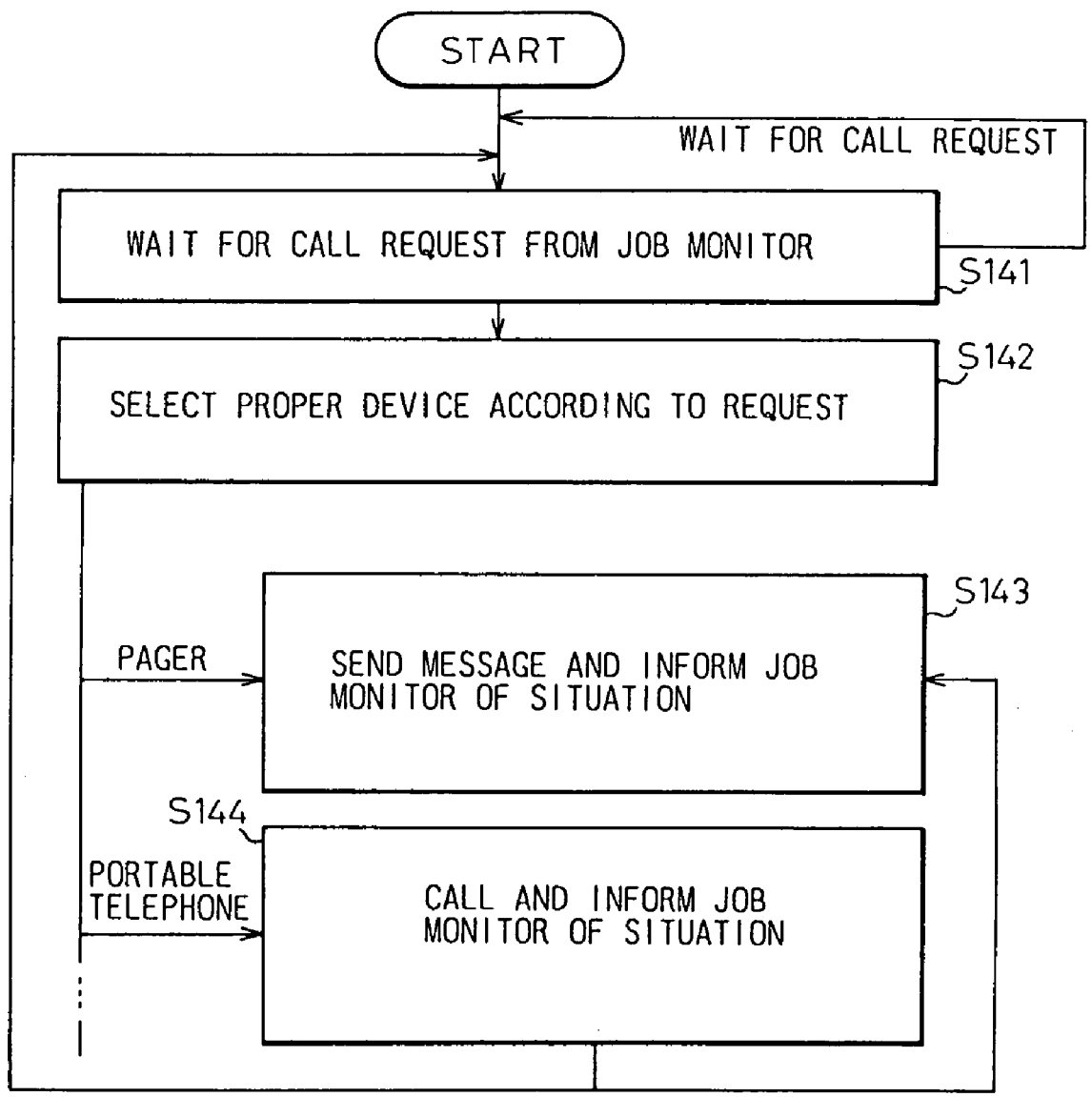
FIG. 44 is a flowchart showing steps taken by a request unit.

FIG. 44 is a flowchart showing steps taken by the request unit 10a. Step S141 waits for a call request from the job monitor 2. Step S142 selects a communication unit such as a pager and a portable telephone according to the request from the job monitor 2. Step S143 sends a message to a receiver and informs the job monitor 2 of the situation. Step S144 makes a call and informs the job monitor 2 of a result of the call.

Figure 45:
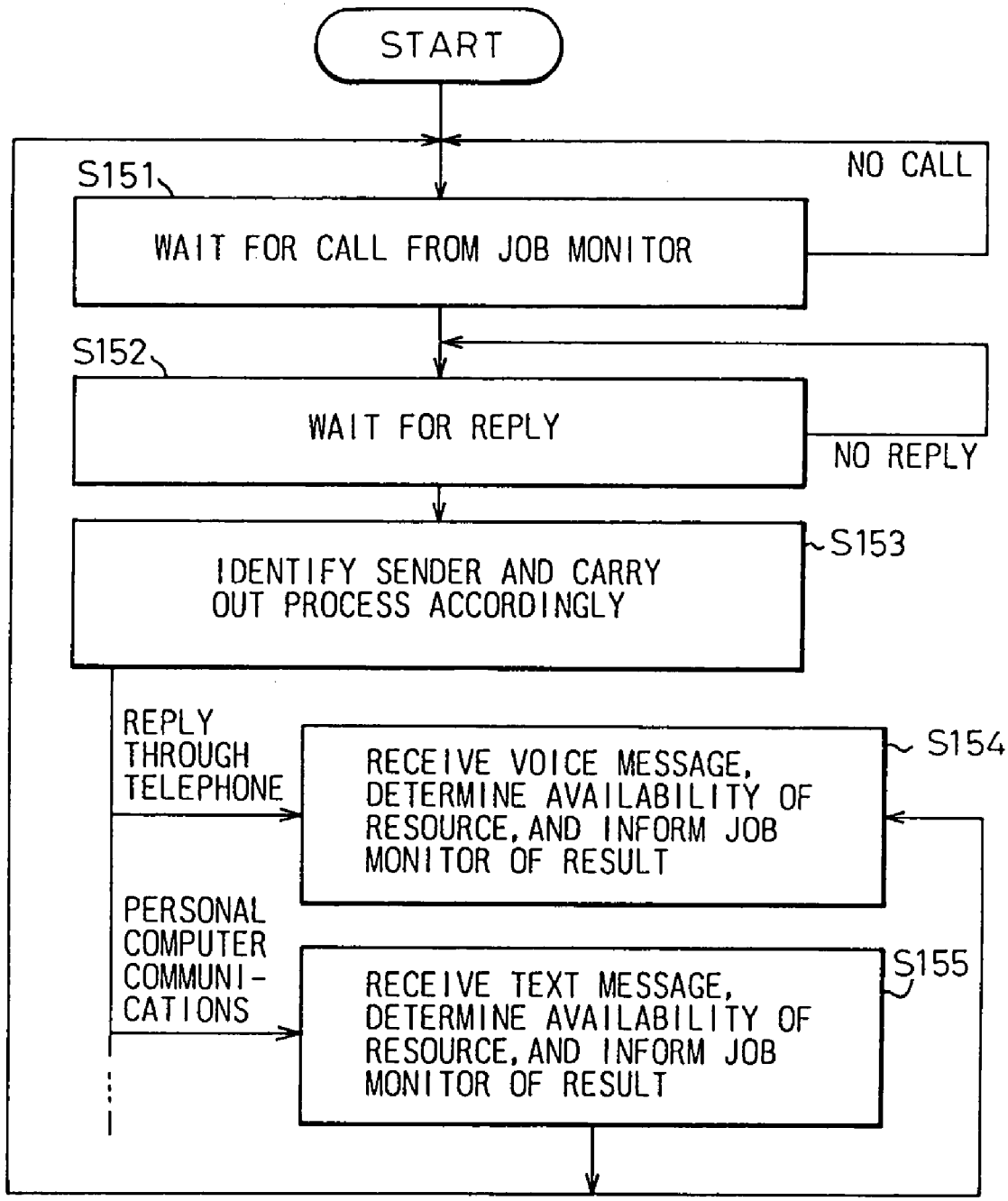
FIG. 45 is a flowchart showing steps taken by a receiver.

FIG. 45 is a flowchart showing steps taken by the receiver 10b. Step S151 waits for a call from the job monitor 2. Step S152 waits for a reply. Step S153 identifies a sender of a reply and carries out a process accordingly. Step S154 receives a voice message, determines whether or not a requested resource of the sender is available according to the message, and informs the job monitor 2 of the result. Step S155 receives a text message, determines whether or not the requested resource of the sender is available, and informs the job monitor 2 of the result.

Figure 46:
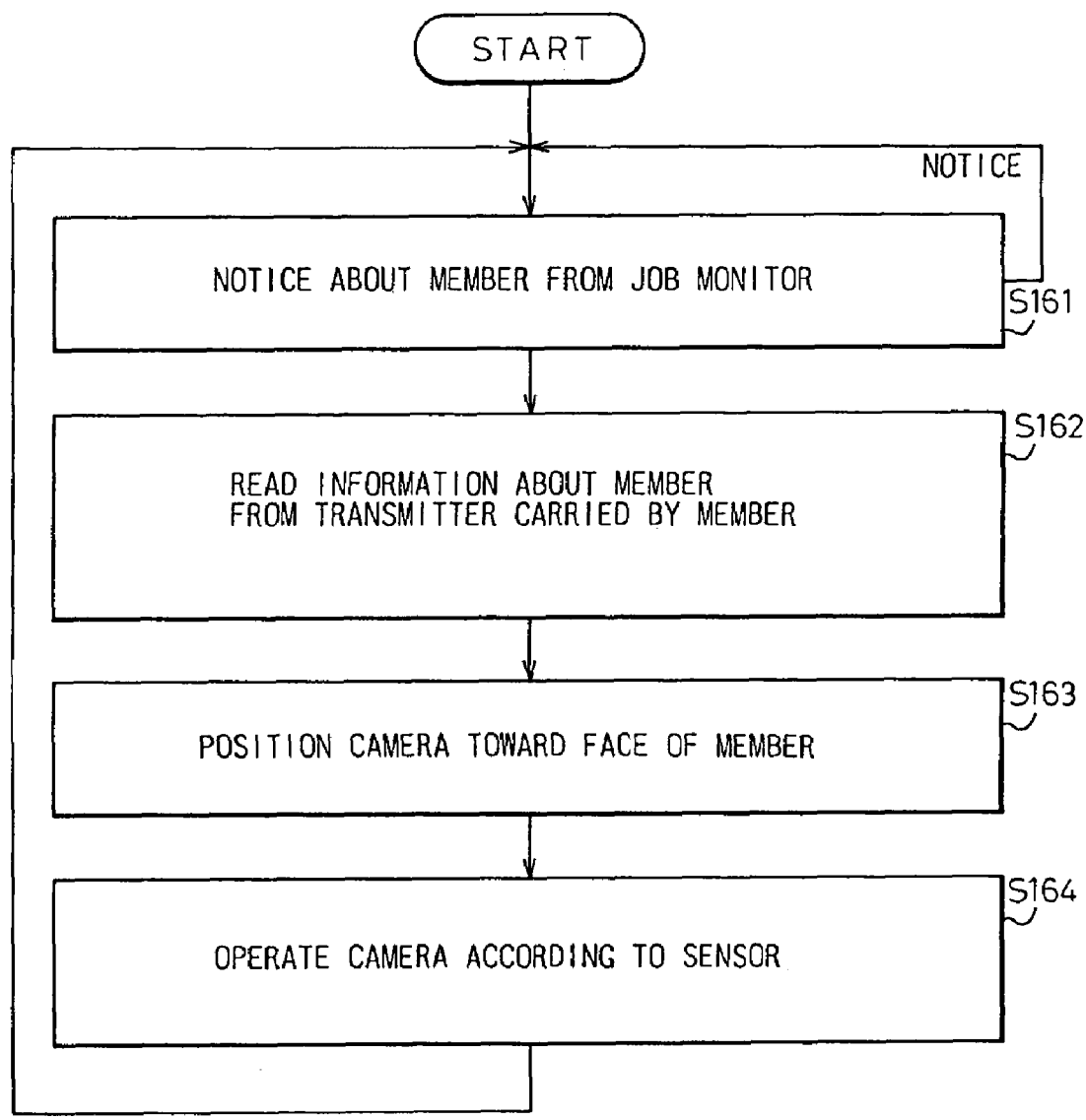
FIG. 46 is a flowchart showing steps taken by a positioner.

FIG. 46 is a flowchart showing steps taken by the positioner 8 for positioning a television camera. Step S161 receives information about a member. Step S162 obtains information about the member according to a transmitter card carried by the member. The camera is positioned according to the position of the transmitter card, to read a bar-code attached to the member. Step S163 sets the camera toward the face of the member. Situations to position the camera are stored in the resource manager 5 through the job monitor 2, to recognize the presence of the member. Step S164 follows the position of the member according to a signal from a sensor. If the job is complete, or if the member takes a rest, the operation is stopped. When the job is resumed, the event is informed to the job monitor 2. The member is automatically traced according to a signal from the transmitter card.

Figure 47:
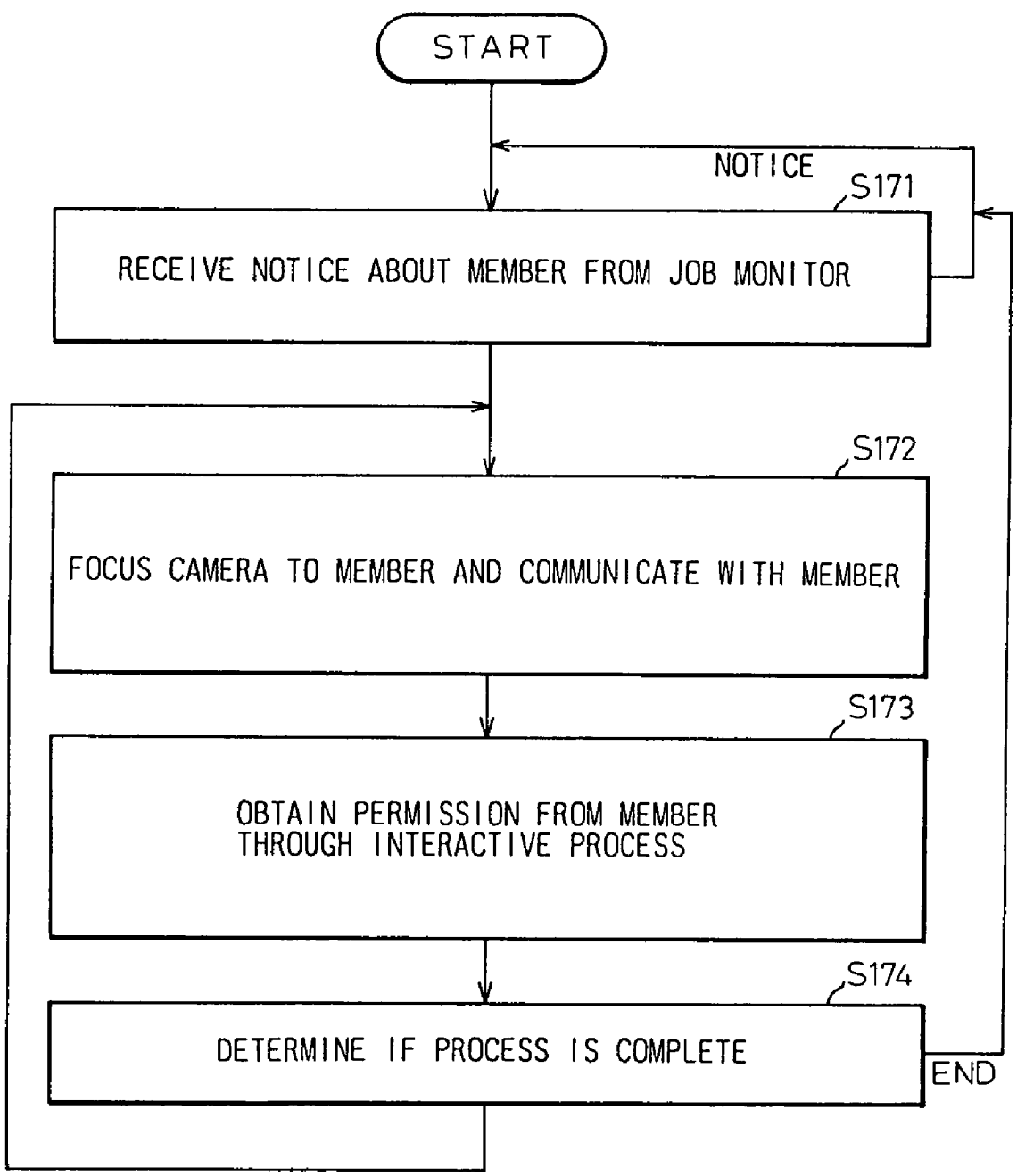
FIG. 47 is a flowchart showing steps taken by an I/O unit.

FIG. 47 is a flowchart showing steps taken by the I/O device 8 such as a television camera. Step S171 receives a notice about a member from the job monitor 2. Step S172 measures a distance to the member through the camera and focuses the camera to the member. Step S173 obtains permission from the member through an interactive process with the member and informs the job monitor 2 of the result. The member is identified according to an ID code and a password. The camera always photographs the member. Step S174 determines if the process is complete. The permission is made with the fingers or voice of the member. When the voice is used, the voice is recognized and sent to the job monitor 2, which sends information contained in the voice to the resource manager 5. The voice is used to determine whether or not a resource is given to another group and the period during which the resource is given to the group. A DP method or a power spectrum analysis is used to determine the characteristic points of voice.

Figure 48:
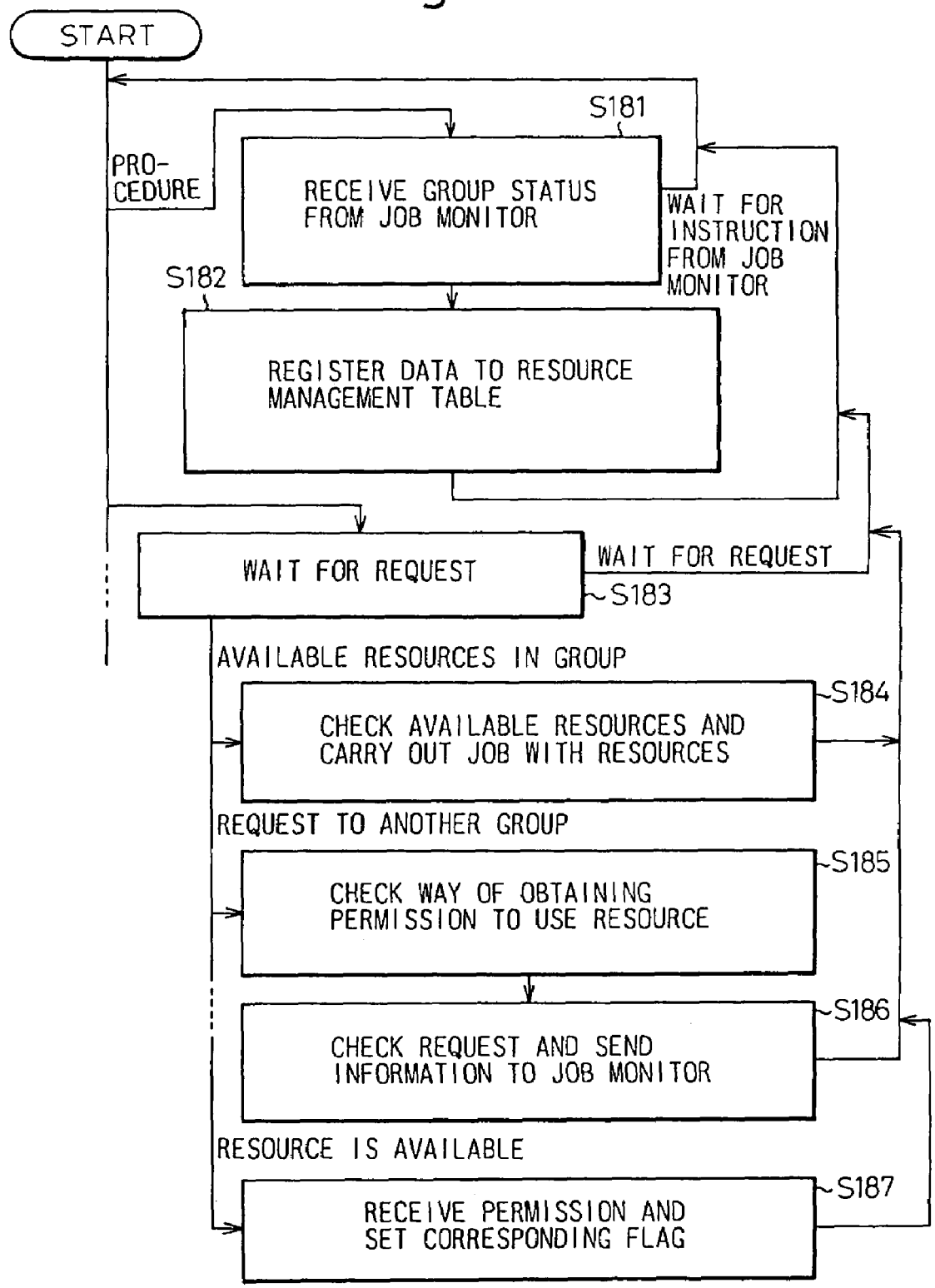
FIG. 48 is a flowchart showing steps taken by a resource manager, etc.

FIG. 48 is a flowchart showing steps taken by the resource manager 5 and other units. Step S181 receives group status from the job monitor 2. Step S182 registers the name of each group, the members of each group who are authorized to give permission of the use of resources, the right to use resources, monitoring devices, etc., to the resource management table 51. Step S183 waits for a request from the job monitor 2. Step S184 checks available resources including windows, objects, and commands of each group, and each group carries out a job with the available resources. Step S185 checks a way of receiving permission to use a resource of another group and confirms the situation of an authorized member of another group through a monitor or a mobile telephone. Step S186 requests the job monitor 2 to receive permission of the use of the resource. Step S187 receives the permission and sets a corresponding flag.

Figure 49:
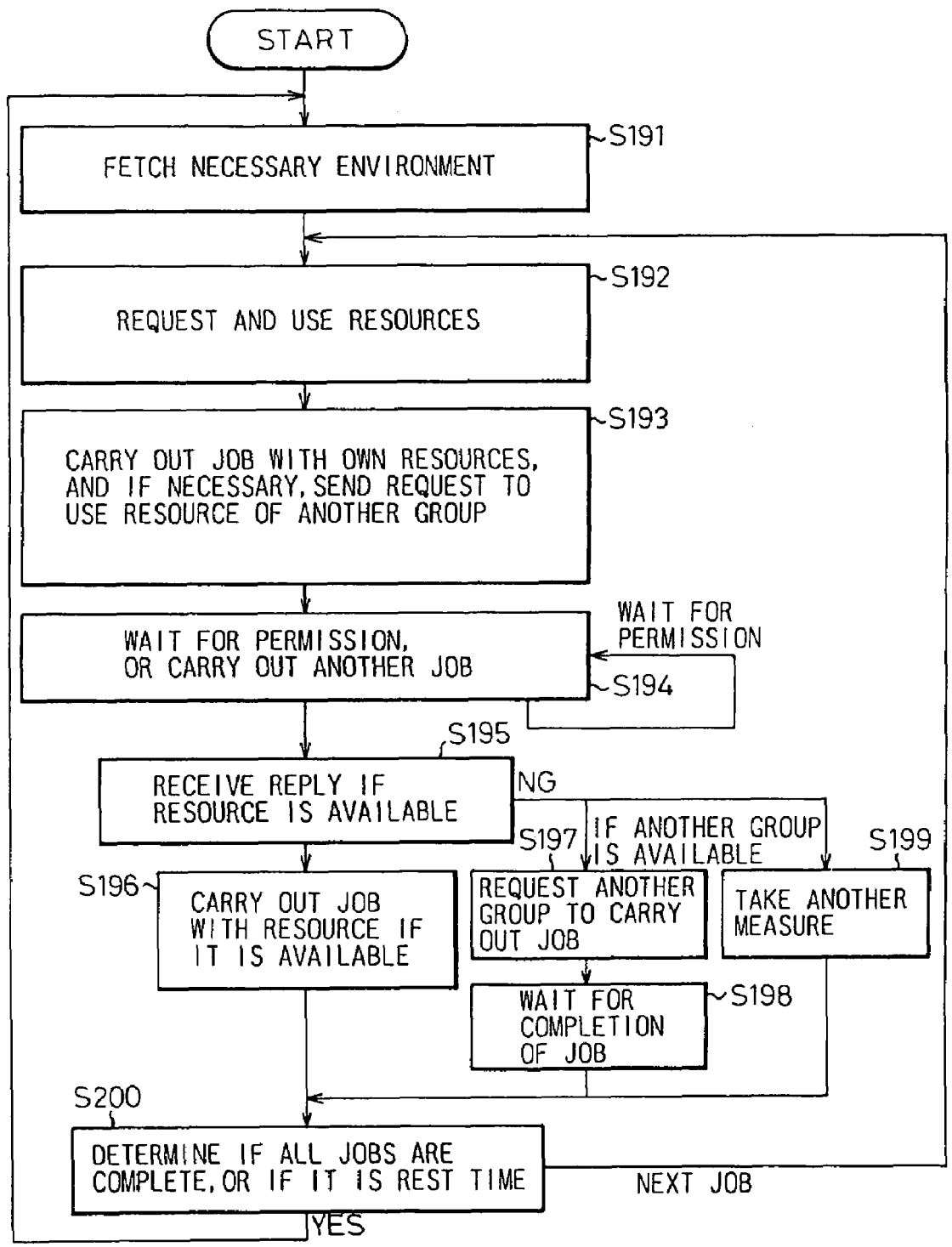
FIG. 49 is a flowchart showing steps taken by a group.

FIG. 49 is a flowchart showing steps taken by each group. Step S191 requests the job monitor 2 for a resource. Step S192 fetches required environment with the use of a password and a video monitor function. In step S193, each group carries out a job with its own resources under the environment. If a resource of another group is necessary, a request to use the resource is sent to the job monitor 2. At this time, a time or a period to use the resource is specified. Step S194 waits for a reply or carries out another job. Step S195 receives a reply if the requested resource is available. If it is available, step S196 uses the resource. Step S197 requests another group to carry out the job. Step S198 waits for the completion of the job. If the resource is not available in step S195, step S199 takes another measure. Step S200 determines if all jobs are complete, or if it is rest time.

Figure 50:
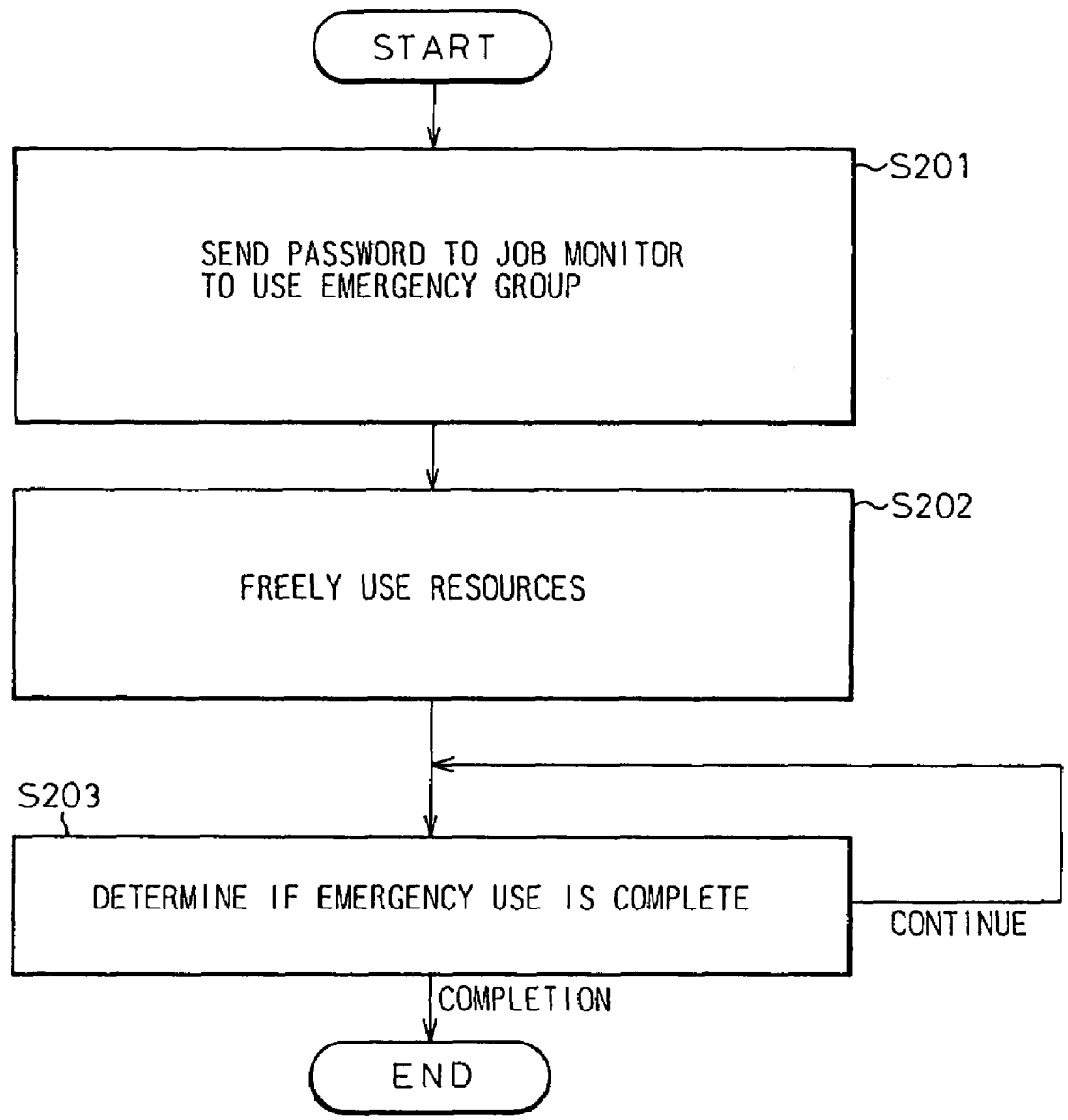
FIG. 50 is a flowchart showing steps taken by an emergency group.

FIG. 50 is a flowchart showing steps taken by the emergency group 6. Step S201 sends a password to the job monitor 2, to execute the right to use the emergency group 6. Step 202 freely uses resources without regard to schedules or authorization of members that control the resources. Step S203 determines if the emergency use is complete. If it is complete, the flow ends.

Figure 51:
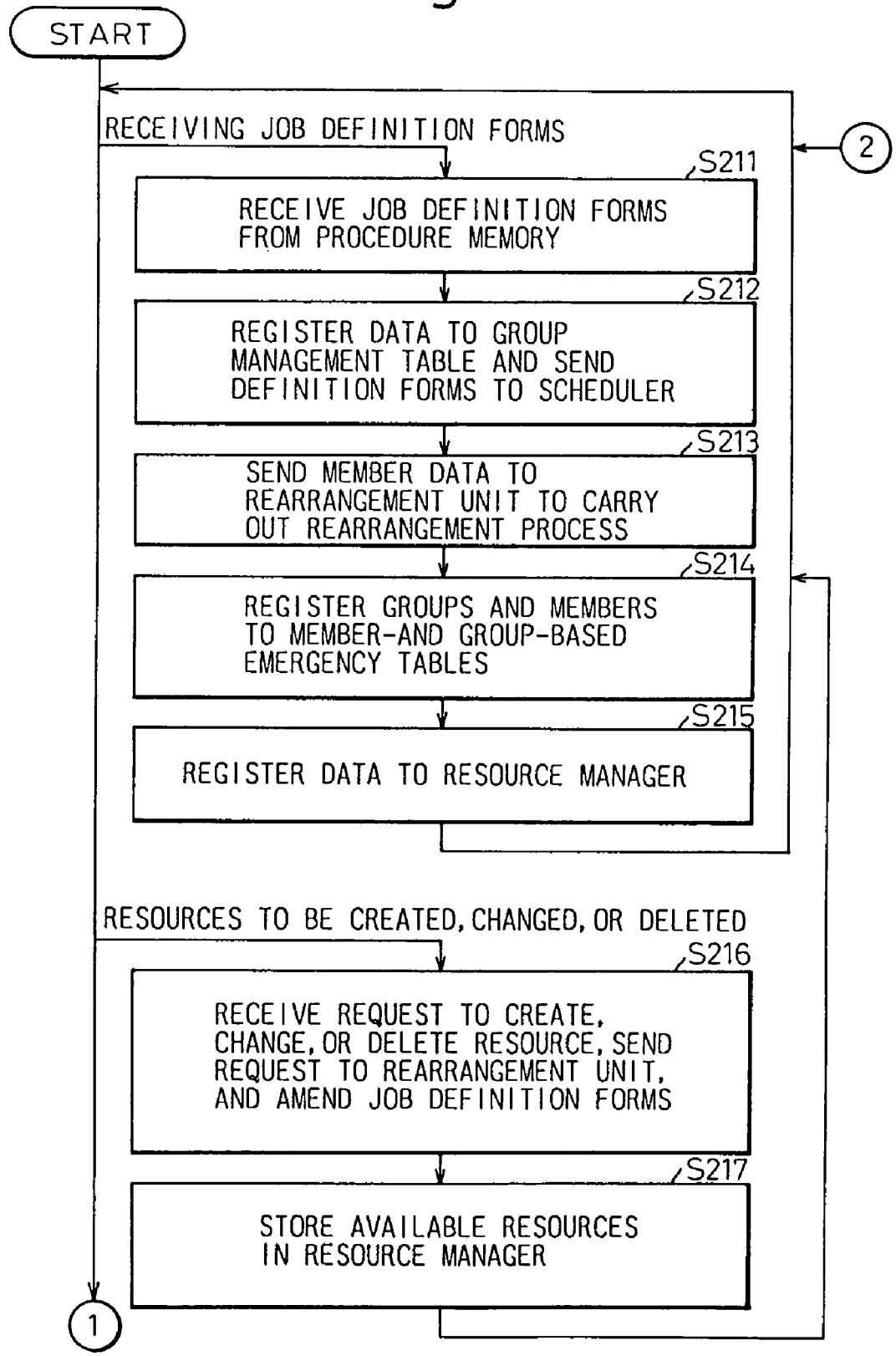
FIG. 51 is a flowchart showing steps taken by a job monitor.

FIGS. 51 to 54 are flowcharts showing steps taken by the job monitor 2. In FIG. 51, step S211 receives job definition forms from the procedure memory 1. Step S212 registers data to the group management table 21 and provides the scheduler 3 with copies of the job definition forms. Step S213 provides the rearrangement unit 4 with members mentioned in the definition forms and carries out a rearrangement process. Step S214 registers members and groups to the member- and group-based emergency tables. Step S215 registers data such as contact addresses to the resource manager 5 according to the job definition forms. If resources are created, changed, or deleted during the execution of jobs, step S216 sends information about these events to the rearrangement unit 4 and amends the job definition forms. Step S217 stores available resources and related groups and members into the resource manager 5.

Figure 52:
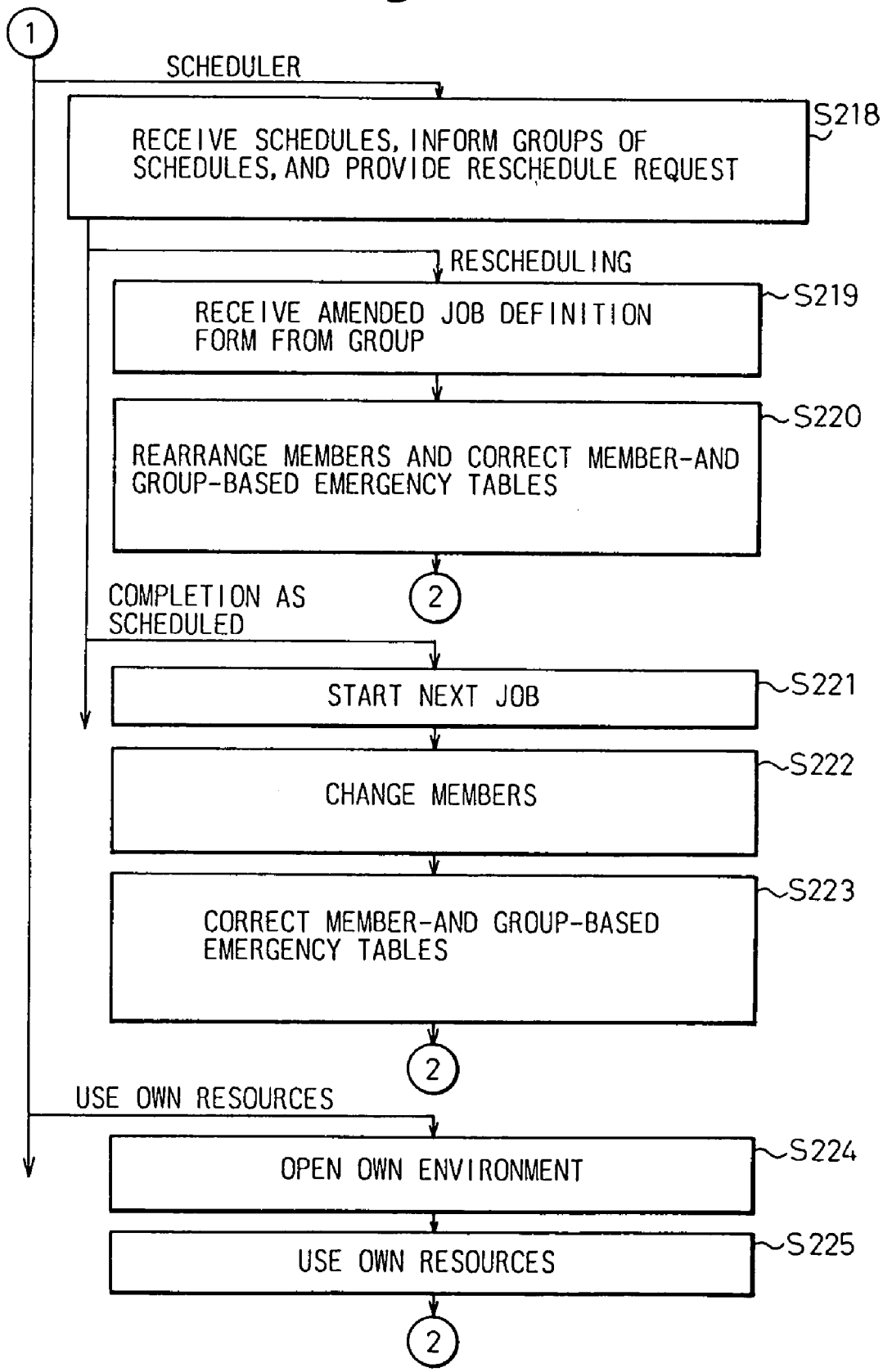
FIG. 52 is a continuation of FIG. 51.

In FIG. 52, step S218 receives schedules from the scheduler 3, informs the groups of the schedules, and if any group is behind the schedule, provides a reschedule request. Step S219 receives an amended job definition form from the group. In step S220, the rearrangement unit 4 rearranges the members of the group. The member- and group-based emergency tables are corrected accordingly. When step S218 is normally carried out, step S211 starts the next job. In step S222, the rearrangement unit 4 rearranges members. Step S223 corrects the member- and group-based emergency tables accordingly. In step S224, each group opens its own environment with the use of a card number or a password. In step S225, each group uses its own resources.

Figure 53:
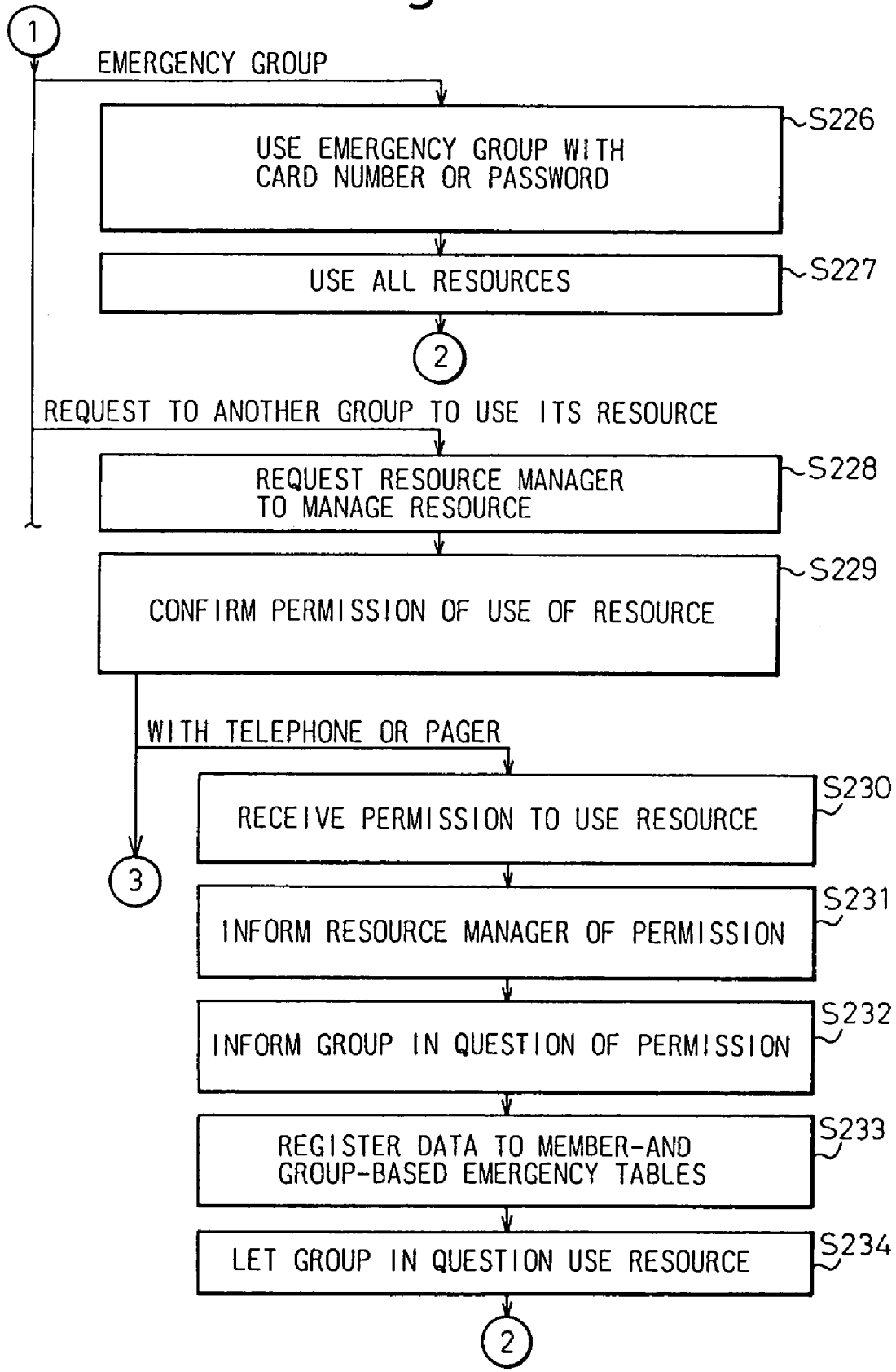
FIG. 53 is a continuation of FIG. 51.

In FIG. 53, the emergency group 6 may be used by any group with a card number or a password in step S226. Step S227 uses all resources. Step S228 requests the resource manager 5 to manage the resource that is requested by another group. Step S229 uses the request unit 10a and receiver 10b to confirm permission to use the resource. Step S230 receives permission to use the resource through a telephone or a pager of the units 10a and 10b. Step S231 informs the resource manager 5 of the permission. Step S232 informs the group in question of the permission. Step S233 registers data to the member- and group-based emergency tables according to the permission. In step S234, the group uses the resource.

In FIG. 54, step S235 asks permission to use a resource through a television camera or a voice device. Step S236 receives permission by voice or text. Step S237 informs the group that asked for the resource of the permission in response to a password. In step S238, the group uses the resource.

Step S239 sends a request to a group that controls a resource for permission to use the resource. Step S240 sets a flag to indicate that the resource is temporarily available for the group that has requested the same. Step S241 receives a notice of the completion of the use of the resource and informs the same to the group that permitted the use of the resource. If the use of the resource is not permitted, step S242 informs the group that requested the resource, and the flow ends.

In each group, members that are allowed to use resources may be limited. Environments for members that develop a project may be limited in a definition form. Each member may manage local files other than resources. The local files may be exchanged among the members according to the present invention, to promote the progress of jobs among the groups.

A resource may be given to a member who is identified by the use of a password. Permission to use a resource may be given by a message. The message may be made by voice, image, fingers, camera, characters, etc.

According to the second aspect of the present invention, the procedure memory (input unit) 1, scheduler 3, rearrangement unit 4, request unit 10a, and receiver 10b may be incorporated in the job monitor 2. These units may be descrete. The input unit and positioner 8 including a television camera may be connected to a personal computer of each group, or to the job monitor 2. Each group may visually monitor the members thereof. In this case, the resource manager 5 is not required to store similar information.

According to the first aspect of the present invention, resources belonging to a given group are exclusively used by the group, to prevent a destruction of the resources due to external illegal accesses. Data may be exchanged among the groups through a job monitor to maintain the security of the resources. A job that is hardly carried out by a group may be requested to another group through the job monitor. The resources are managed according to job procedures specified in a job definition form. Jobs are carried out by the groups in parallel with one another and are easily monitored by the job monitor, to effectively use the resources such as groupware among the groups that are connected to one another through a network and improve the operations of each group.

The second aspect of the present invention exchanges resources among groups through a job monitor to maintain the security of the resources. Any group can request another group to carry out a job if it is hard for the group to carry out the job. If a member who is authorized to grant permission of the use of a resource is absent, the absence of the member is sensed and a portable telephone or a pager is used to contact the member. Permission to use a resource belonging to a group may be given by all, several, or a specific one of the members of the group. This information is known in advance to minimize the permission process. In this way, the second aspect manages the rights to use resources according to job definition forms. Jobs are carried out by the groups in parallel with one another and are easily monitored and controlled by the job monitor, to effectively use the resources such as groupware among the groups that are connected to one another through a network and improving the operations and communications of each group.

What is claimed is:

1. A computer system performing real-time management of object-oriented system objects as job objects among groups of workers as worker groups in communication with each other via networked computers, said computer system comprising:
   a memory; and
   a computer processor executing
   a form generator generating job definition forms, and storing the job definition forms in the memory, each job definition form defining worker groups, and defining on a worker group by worker group basis a job procedure, a job object as a resource available to the worker group for processing the object of the object-oriented system and a job object condition;
   a resource manager managing the job-object conditions, including rights to use resources, worker group by worker group in real-time based upon the worker groups and resources defined in the job definition form;
   a scheduler establishing the job-object conditions and scheduling each worker group to process the job objects, according to each worker group job procedure and the resources available to each worker group defined in the job definition form;
   a job monitor performing real-time monitoring of job processing by the worker groups based upon the procedure of each worker group in the job definition form and performing real-time controlling of sharing of the resources, including the job-objects, among the worker groups while maintaining security of the job objects according to the job-object conditions managed by the resource manager group by group and/or member by member thereof, thereby for a first worker group or a member thereof inhibiting access to the job objects thereof from another worker group or a member thereof to which permission to use the job objects of the first worker group or the member thereof is not allocated; and a rearranger managing worker rearrangements and the job objects of the worker groups according to a progress of the jobs from the job monitor based upon the job procedure of each worker group in the job definition form.

2. The system according to claim 1, wherein said resource manager, job monitor, and scheduler exchange rights to use the job objects among the worker groups.

3. The system according to claim 1, wherein:

an emergency group is allowed to access every job object of every worker group; and said job monitor accepts any request from the emergency worker group for accessing a job object.

4. The system according to claim 1, wherein said job monitor performs at least one of transferring a job object from one of the worker groups to another worker group and automatically changing the job objects of any one of the worker groups according to a procedure.

5. The system according to claim 1, wherein the job definition forms define group permission information, the system further comprising a requesting unit that, when a first group makes a request to use a job object of a second group, uses the group permission information to contact the second group for permission to use the job object.

6. The system according to claim 5, wherein said request unit uses one of a telephone and a pager to request the second worker group for permission to use the job object.

7. The system according to claim 5, wherein said request unit uses one of a telephone, a notebook computer, an electronic notepad, and a workstation through one of a wide-area network, a personal computer communication network, and a wireless network to request the second worker group for permission to use the job object.

8. The system according to claim 5, further comprising a visual I/O unit and an audio I/O unit to request the second worker group for permission to use the job object.

9. The system according to claim 5, further comprising:

an input device, attached to a selected member of the second worker group, for identifying and locating the member; and a positioning unit generating an image of the selected member, said input unit and positioning unit being used to directly request the member of the second worker group for permission to use the job object.

10. The system according to claim 5, wherein said job monitor holds the schedules of the jobs of the worker groups and exchanges the jobs among the worker groups.

11. The system according to claim 5, wherein said job monitor limits location, period, and each worker group to handle a job object, to thereby strictly maintain the security of the job object.

12. The system according to claim 5, wherein said job monitor indicates whether permission for use of the job object is to be granted upon approval of all or some of the members of the second worker group.

13. The system according to claim 5, wherein said job monitor adds a name of a worker group to which a job object belongs to a name of the job object, whereby plural job objects having the same name can be allocated to the worker group.

14. The system according to claim 5, wherein said job monitor allocates a representative name to a set of job objects and identically handles the job objects under the representative name.

15. The system according to claim 9, wherein said input device is a virtual-reality device attached to the selected member, to identify the location of the member.

16. The system according to claim 9, wherein said input device is a head-mount display worn by the selected member so that the member may give permission to use the job object.

17. The system according to claim 9, wherein said input device is provided with at least one of a password and an ID, to prevent illegal access to said input device.

18. The system according to claim 8, wherein:

said visual I/O unit is a television camera; and said audio I/O unit is a microphone.

19. The system according to claim 9, wherein:

said input unit is one of a sensor and a transmitter; and said positioning unit is a television camera.

20. A method of performing real-time groupwise management of object-oriented system objects as job objects, comprising:

storing by a computer groups of workers as worker groups;

generating job definition forms, each job definition form defining worker groups and defining on a worker group basis a job procedure, a job object as a resource available to the worker group, for processing the object of the object-oriented system and a job object condition;

managing the job-object conditions, including rights to use resources, worker group by worker group in real-time based upon the worker groups and resources defined in the job definition form;

establishing the job-object conditions according to the each worker group job procedure defined in the job definition form;

scheduling each worker group to process the job objects, according to each worker group procedure and the resources available to each worker group defined in the job definition form;

monitoring, in real-time, job processing by the worker groups based upon the procedure of each worker group in the job definition form; and controlling, in real-time, sharing of the resources, including the job objects, among the worker groups while maintaining security of the job objects according to the managed job-object conditions group by group and/or member by member thereof by inhibiting access to a job object of a first worker group or a member thereof from another worker group or a member thereof to which permission to use the job object of the first worker group or the member thereof is not allocated; and managing worker rearrangements and the job objects of the worker groups according to a progress of the jobs from the job monitor based upon the job procedure of each worker group in the job definition form.

21. The method according to claim 20, further comprising setting as one of the job-object conditions rights to use the job objects among the worker groups processing the job objects.

22. The system according to claim 1, wherein as the job object conditions, each job definition form identifies for each worker group, information indicating the rights to use the job objects, and at least one of a job period, worker group members, processes, the job objects allocated to the job carried out by the worker group, and permission information of the job objects.

23. A computer-readable medium encoded with a program performing real-time groupwise management of object-oriented system objects as job objects, by:
controlling a computer to execute operations comprising:
storing groups of workers as worker groups generating job definition forms, each job definition form defining worker groups and defining on a worker group by worker group basis a job procedure, a job object as a resource available to the worker group for processing the object of the object-oriented system and a job object condition;
managing the job-object conditions, including rights to use resources, worker group by worker group in real time based upon the worker groups and resources defined in the job definition form;
establishing the job-object conditions according to each worker group procedure defined in the job definition form;
scheduling each worker group to process the job objects, according to each worker group procedure and the resources available to each worker group defined in the job definition form;
monitoring, in real-time, job processing by the worker groups based upon the procedure of each worker group in the job definition form;
controlling, in real-time, sharing of the resources, including the job objects, among the worker groups while maintaining security of the job objects according to the managed job-object conditions group by group and/or member by member thereof by inhibiting access to a job object of a first worker group or a member thereof from another worker group or a member thereof to which permission to use the job object of the first worker group or the member thereof is not allocated; and
managing worker rearrangements and the job objects of the worker groups according to a progress of the jobs from the job monitor based upon the job procedure of each worker group in the job definition form.

24. The computer readable medium of claim 23, the program further comprising a function of storing a job definition form defining for each group the jobs, the form indicating rights to use the resources, wherein the job definition form identifies for each job carried out by each group, as information indicating the rights to use the resources, at least one of a job period, group members, the resources allocated to the job to be carried out by the group, and permission information of the resources.

25. A computer system performing real-time management of object-oriented system objects as job objects among groups of workers as worker groups in communication with each other via networked computers, said computer system comprising:
a memory; and
a computer processor executing
a form generator generating job definition forms, and storing the job definition forms in the memory, each job definition form defining worker groups, and defining on a worker group by worker group basis a job procedure, a job object as a resource available to the worker group for processing the object of the object-oriented system and a job object condition;
a resource manager managing the job-object conditions, including rights to use resources, worker group by worker group in real-time based upon the worker groups and resources defined in the job definition form;
a scheduler establishing the job-object conditions and scheduling each worker group to process the job objects, according to each worker group job procedure and the resources available to each worker group defined in the job definition form;
a job monitor performing real-time monitoring of job processing by the worker groups based upon the procedure of each worker group in the job definition form and performing real-time controlling of sharing of the resources, including the job-objects, among the worker groups while maintaining security of the job objects according to the job-object conditions managed by the resource manager group by group and/or member by member thereof, thereby for a first worker group or a member thereof inhibiting access to the job objects thereof from another worker group or a member thereof to which permission to use the job objects of the first worker group or the member thereof is not allocated; and
a rearranger managing worker rearrangements and the job objects of the worker groups according to a progress of the jobs from the job monitor based upon the job procedure of each worker group in the job definition form;
wherein as the job-object conditions, each job definition form identifies for each worker group, information indicating the rights to use the job objects, and at least one of a job period, worker group members, the job objects allocated to the job to be carried out by the worker group, and the permission information of the job objects, and
wherein said resource manager, job monitor, and scheduler exchange rights to use the job objects among the worker groups, based upon the job-object conditions of each worker group defined in the job definition form.

* * * * *